(12) United States Patent
Banerjea et al.

(10) Patent No.: US 8,738,013 B2
(45) Date of Patent: *May 27, 2014

(54) 802.11 MESH ARCHITECTURE

(75) Inventors: Raja Banerjea, Sunnyvale, CA (US); Sandesh Goel, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 1889 days.

This patent is subject to a terminal disclaimer.

(21) Appl. No.: 11/736,071

(22) Filed: Apr. 17, 2007

(65) Prior Publication Data

US 2007/0248065 A1 Oct. 25, 2007

Related U.S. Application Data

(60) Provisional application No. 60/794,383, filed on Apr. 24, 2006.

(51) Int. Cl.
| | | |
|---|---|---|
| *H04W 40/00* | (2009.01) | |
| *H04W 4/00* | (2009.01) | |
| *H04B 7/00* | (2006.01) | |
| *H04L 12/28* | (2006.01) | |
| *H04J 1/16* | (2006.01) | |
| *H04H 20/71* | (2008.01) | |
| *H04J 3/24* | (2006.01) | |
| *H04L 12/66* | (2006.01) | |

(52) U.S. Cl.
USPC ....... 455/445; 455/41.2; 455/426.2; 370/238; 370/254; 370/312; 370/349; 370/352; 370/389; 370/392; 370/401; 370/406

(58) Field of Classification Search
USPC ......... 370/238, 254, 315, 338, 392, 401, 351, 370/312, 349, 352, 389, 406; 455/41.2, 455/426.2, 445; 709/222, 238
See application file for complete search history.

(56) References Cited

U.S. PATENT DOCUMENTS

| | | | |
|---|---|---|---|
| 5,987,011 A | 11/1999 | Toh | |
| 6,304,556 B1 * | 10/2001 | Haas | 370/254 |

(Continued)

FOREIGN PATENT DOCUMENTS

| | | |
|---|---|---|
| JP | H 04-127399 | 4/1992 |
| JP | 2003-249937 A | 9/2003 |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner* — Inder Mehra

(57) ABSTRACT

A wireless network device includes a forwarding table and a mesh routing module. The forwarding table is configured to store direct and reverse entries, each including a destination address, a next hop address, and a metric. The metric of the direct entries corresponds to a route from the wireless network device to the destination address. The metric of the reverse entries corresponds to a route from the destination address to the wireless network device. The mesh routing module is configured to (i) wirelessly receive route discovery packets, including a first route discovery packet, and (ii) create, based on the route discovery packets, corresponding direct entries and reverse entries in the forwarding table. The mesh routing module is configured to, in response to receiving the first route discovery packet, create a corresponding direct entry in the forwarding table and create a corresponding reverse entry in the forwarding table.

28 Claims, 23 Drawing Sheets

(56) References Cited

U.S. PATENT DOCUMENTS

| | | | |
|---|---|---|---|
| 7,072,650 B2* | 7/2006 | Stanforth | 455/426.2 |
| 7,643,467 B2 | 1/2010 | Smith et al. | |
| 2002/0058502 A1 | 5/2002 | Stanforth | |
| 2002/0071395 A1 | 6/2002 | Redi et al. | |
| 2003/0033394 A1* | 2/2003 | Stine | 709/222 |
| 2003/0054818 A1 | 3/2003 | Bahl et al. | |
| 2004/0235468 A1 | 11/2004 | Luebke et al. | |
| 2005/0099222 A1 | 5/2005 | Yang et al. | |
| 2005/0181779 A1 | 8/2005 | Jones et al. | |
| 2006/0109787 A1 | 5/2006 | Strutt et al. | |
| 2007/0091871 A1* | 4/2007 | Taha | 370/352 |
| 2007/0201382 A1 | 8/2007 | Ekl et al. | |
| 2008/0137580 A1* | 6/2008 | Axelsson et al. | 370/315 |
| 2009/0135824 A1* | 5/2009 | Liu | 370/392 |

FOREIGN PATENT DOCUMENTS

| | | |
|---|---|---|
| JP | 2005-033557 | 2/2005 |
| JP | 2005-033557 A | 2/2005 |
| JP | 2006-067608 A | 3/2006 |
| WO | WO-02/084956 A1 | 10/2002 |
| WO | WO 2004/100454 | 11/2004 |
| WO | WO-2005/076889 A2 | 8/2005 |

OTHER PUBLICATIONS

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE P802.11s/D1.00, Nov. 2006; Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking; 243 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE Std 802.11n; IEEE P802.11-04/0889r6; Wireless LANs, TGn Sync Proposal Technical Specification; May 2005; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.20-Pd-06, IEEE P 802.20 V14, Jul. 16, 2004, Draft 802.20 Permanent Document, System Requirements for IEEE 802.20 Mobile Broadband Wireless Access Systems—Version 14, 23 pages.

OLPC Mesh Routing Design Document; Marvell; Jun. 29, 2006; 41 pages.

Notification of Transmittal of The International Search Report and The Written Opinion of The International Searching Authority, or The Declaration dated Feb. 19, 2008 in reference to PCT/US2007/ 009863.

Summary of "Notice of Reasons for Rejection" for related Japanese Application No. 2012-065431; Ryuka IP Law Firm; Aug. 13, 2013; 2 pages.

The Office Action issued in the corresponding Japanese Patent Application No. JP2009-507750, and its English translation, dated Nov. 8, 2011, 4 pages.

* cited by examiner

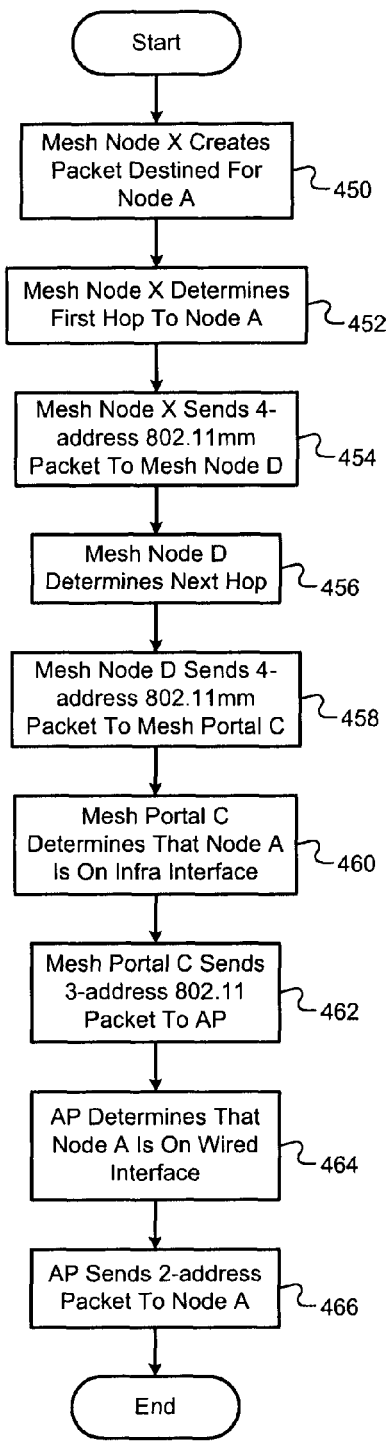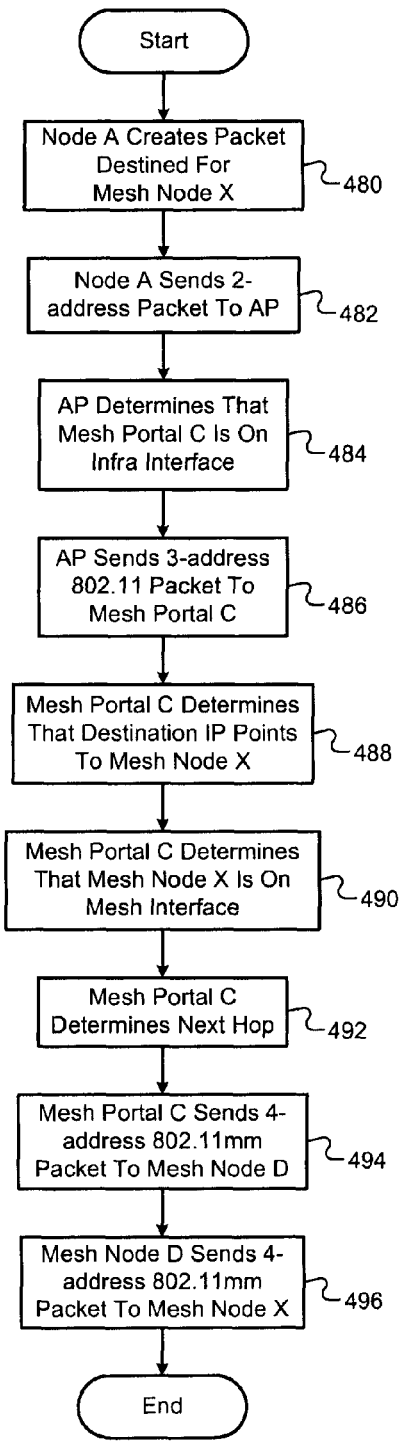
FIG. 7A  FIG. 7B

| Information from: | FWT | Dir/Rev | Dest. | Next Hop | Metric | SSN | Exp. |
|---|---|---|---|---|---|---|---|
| RREQ_A | X | Rev | W | W | 21 | w | - |
| RREQ_B | Y | Rev | W | W | 13 | w | - |
| RREQ_C | X | Rev | W | Y | 18 | w | - |
| RREQ_D | Z | Rev | W | Y | 24 | w | - |
| RREQ_E | Y | Rev | W | X | 23 | w | - |
| RREQ_E | Z | Dir | Z | X | 23 | w | - |
| RREP_A | X | Rev | Z | Z | 5 | - | 120 min |
| RREP_A | X | Dir | Z | Z | 9 | z | - |
| RREP_B | Y | Rev | Z | X | 10 | - | 120 min |
| RREP_B | Y | Dir | Z | X | 16 | z | - |
| RREP_C | Z | Rev | Z | Y | 23 | - | 120 min |
| RREP_C | Z | Dir | Z | Y | 21 | z | - |
| Route Ack | Z | Dir | W | X | 21 | - | 120 min |

654

RREQ Packet Format

| Field | Bytes | Value |
|---|---|---|
| ID | 1 | Reserved |
| Length | 4 | Length of the RREQ |
| Mode Flag | 1 | Bit 0: 0 – Unicast, 1 – Broadcast<br><br>Bit 1: 1 – Mesh Portal Announcement |
| TTL | 1 | Maximum number of hops this packet can traverse |
| Destination Count | 1 | Number of destinations in the message |
| Hop Count | 1 | Number of hops from the source to the node handling the message |
| RREQ ID | 2 | In combination with the Source Address, uniquely identifies the RREQ |
| Source Address | 6 | Source MAC address |
| Source Sequence Number | 2 | Identifies order of route discoveries- incremented for each route discovery initiated |
| Metric | 2 | Cumulative metric from the RREQ source up to and including the link transmitting the RREQ |
| Destination Flag | 1 | Bit 0: Destination Only<br>  0 – An intermediate node that has the destination address in its FWT can send a proxy RREP<br>  1 – Only the final destination can send a RREP<br><br>Bit 1: Always Forward<br>  0 – Do not forward RREQ if proxy reply is sent<br>  1 – Forward RREQ regardless of proxy reply |
| Destination Address | 6 | Destination MAC address |
| Destination Sequence Number | 2 | Reserved |

FIG. 13A

RREP Packet Format

| Field | Bytes | Value |
|---|---|---|
| ID | 1 | Reserved |
| Length | 4 | Length of the RREP |
| Mode Flag | 1 | Reserved |
| TTL | 1 | Maximum number of hops this packet can traverse |
| Source Count | 1 | Number of sources in the message |
| Hop Count | 1 | Number of hops from the source to the node handling the message |
| Received Channel Metric | 2 | Channel metric for the best route, as determined by the RREQs |
| RREP ID | 2 | In combination with the Destination Address, uniquely identifies the RREP |
| Destination Address | 6 | Destination MAC address (note that the Source Address of the RREQ becomes the Destination Address of the RREP) |
| Destination Sequence Number | 2 | Identifies route request path so intermediate metrics can be calculated (set to Source Sequence Number of RREQ) |
| Metric | 2 | Cumulative metric from the RREP source up to and including the link transmitting this RREP |
| Source Address | 6 | Source MAC address |
| Source Sequence Number | 2 | Reserved |

FIG. 13B

Destination Table Fields

| Field | Bytes | Description |
|---|---|---|
| Destination Address | 6 | Ultimate destination address of the route |
| Pointer to Next Hop Entry | 4 | Pointer to information on next hop |
| Channel Metric | 2 | A representation of the channel quality that the packet will meet to reach the destination (for direct entries; only an approximate metric for reverse entries) |
| Hop Count | 1 | Number of hops to the destination |
| Direction | 1 | Direct or Reverse |
| Sequence Number | 2 | Used for matching RREPs to reverse routes |
| Lifetime | 8 | Lenth of time this information will be valid |

Next Hop Fields

| Field | Bytes | Description |
|---|---|---|
| Next Hop Address | 6 | MAC address of next hop |
| Rx SNR | 2 | SNR from current node to the specified next hop (updated based on received packets) |
| Sleep Mode State | 1 | 0 – No power save<br>1 – Power save (awake during ATIM)<br>2 – Power save (awake for beacon duration)<br>3 – Low power mode<br>4 – Deep sleep (not awake for multiple beacon durations) |

FIG. 18

Configuration Parameters

| Parameter | Description |
|---|---|
| BATTERY_COST_FCT | The cost factor by which the battery condition is multiplied, which affects the sensitivity of the algorithm to the battery condition |
| DELAY | Delay between the reception of a RREQ message and the transmission of the RREP message |
| MESH_PORT_ANN_DUR | Interval between transmissions of the the broadcast RREQ by the mesh portal |
| BATTERY_COND_DUR | Interval between requesting battery information from host |
| MESH_METRIC_DLT | Threshold that determines selection of the appropriate next hop |
| PAGING_DUR | Duration (in beacon intervals) the node stays in deep sleep mode |
| PAG_INTVL | Duration the node stay will awake to receive an RREQ message in deep sleep mode |
| PAG_AWAKE_INTVL | Duration the node will stay awake to receive transmit data after the reception of a RREQ message when in deep sleep mode |
| RREQ_NUM_RETRANSMISSION | Maximum number of times a broadcast RREQ should be retransmitted |
| MAX_RETRANSMISSION | Maximum number of times a unicast packet should be retransmitted |
| FWT_ENTRY_LIFETIME | Lifetime for an entry to be valid in the forwarding table |

802.11 MESH ARCHITECTURE

CROSS-REFERENCE TO RELATED APPLICATION

This application claims the benefit of U.S. Provisional Application No. 60/794,383, filed on Apr. 24, 2006. The disclosure of the above application is incorporated herein by reference in its entirety.

FIELD

The present disclosure relates to wireless mesh networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

IEEE 802.11, 802.11a, 802.11b, 802.11g, 802.11h, 802.11n, 802.16, and 802.20, which are hereby incorporated by reference in their entirety, define operation and implementation of wireless local area networks (WLANs). These standards define modes of operation for WLANs, including ad-hoc and infrastructure.

Referring now to FIG. 1, a functional block diagram of an ad-hoc wireless network 100 is depicted. The ad-hoc wireless network 100 includes three wireless client stations 104-1, 104-2, and 104-3, although ad-hoc networks with two or more client stations are possible. The client stations 104 together form a basic service set (BSS), identified by a BSS identifier, BSSID. In an ad-hoc network, such as the ad-hoc wireless network 100, the client stations 104 communicate directly with each other as indicated by the arrows in FIG. 1.

A beacon is periodically transmitted by the client stations 104. The beacon includes a timestamp used for synchronization, a beacon interval, and capability information, such as supported transfer rates. After transmission of the beacon, there is an announcement traffic indication message (ATIM) window, the length of which is indicated by the beacon. During the ATIM window, a client station 104 can notify another client station 104 that traffic has been buffered for it.

A beacon interval specifies the amount of time before the next beacon will be transmitted. Based upon the beacon interval, client stations 104 can operate in a low power mode until the next beacon is expected. During low power mode, a client station 104 may power down components, such as transceivers, and/or alter operation to conserve power.

The client station 104 may not be able to transmit or receive data while in low power mode. The client station 104 will resume normal operation in order to receive the beacon, and will remain awake during the ATIM window. If the client station 104 receives or transmits based on a received ATIM, it will stay awake for the remainder of the beacon interval.

Referring now to FIG. 2, a functional block diagram of an exemplary infrastructure mode wireless network 150 is depicted. The infrastructure mode wireless network 150 includes three client stations 154-1, 154-2, and 154-3, which all communicate with a common device, access point (AP) 156.

The client stations 154 and AP 156 together form a BSS. In various implementations, the BSSID is equal to the MAC address of AP 156. AP 156 serves as an intermediary for one client station 154 to communicate with another client station 154. AP 156 may also communicate with a wired network 158, which in turn may communicate with other BSS's (not shown) or other networks, such as the Internet 160.

AP 156 periodically transmits a beacon to the client stations 154 within the BSS. The beacon is a packet or frame of information that informs the client stations 154 about the capabilities of the BSS and coordinates communication within the BSS. The beacon includes the BSSID, the beacon interval, and a delivery traffic indication message (DTIM). The DTIM serves a function similar to the ATIM of an ad-hoc network.

Referring now to FIG. 3, a functional block diagram of an exemplary mesh network 200 is depicted. The mesh network 200 includes specialized mesh portals 202-1 and 202-2, which communicate with a network 204, such as the Internet. The mesh network 200 also includes mesh points 208-1, 208-2, 208-3, 208-4, 208-5, and 208-6. The mesh points 208 communicate with each other according to their physical proximity and signal strength. The mesh points 208 interface with the mesh portals 202 to gain access to the network 204. The mesh portals 202 may relay traffic between each other via the network 204.

SUMMARY

A wireless network device comprises a forwarding table and a mesh routing module. The forwarding table stores direct and reverse entries, each including a destination address, a next hop address, and a metric. The metric of the direct entries corresponds to a route from the wireless network device to the destination address. The metric of the reverse entries corresponds to a route from the destination address to the wireless network device. The mesh routing module wirelessly receives route discovery packets and creates corresponding entries in the forwarding table.

In other features, the mesh routing module wirelessly receives a first route discovery packet including a metric and a source address from a second wireless network device and creates a reverse entry in the forwarding table. The next hop address of the reverse entry is set to an address of the second wireless network device, the destination address of the reverse entry is set to the source address of the first route discovery packet, and the metric of the reverse entry is set to the metric of the first route discovery packet.

In further features, the mesh routing module wirelessly receives a route reply packet including a reply destination address, identifies ones of the reverse entries that have the reply destination address, and transmits the route reply packet to the next hop address of a selected one of the identified reverse entries. The mesh routing module selects the selected one of the identified reverse entries based upon the metrics of the identified reverse entries. The reverse entries each include a sequence number. The mesh routing module sets the sequence number of the reverse entry to a sequence number received in the first route discovery packet.

In still other features, the route reply packet includes a reply sequence number. The mesh routing module chooses ones of the identified reverse entries that have the reply sequence number and selects one of the chosen reverse entries based upon the metrics of the chosen reverse entries. The mesh routing module receives a route request for a requested destination address, identifies ones of the direct entries that have the requested destination address, and selectively responds to the route request with the next hop address of a selected one of the identified direct entries.

In other features, the mesh routing module selects the selected one of the identified direct entries based upon the metrics of the identified direct entries. The direct entries of the forwarding table include an expiration indicator. The mesh routing module selects the selected one of the identified direct entries based upon the expiration indicators of the identified direct entries.

In further features, the mesh routing module transmits a route discovery packet including a cumulative metric to a second wireless network device, determines the cumulative metric based upon a received metric and a link metric, and determines the link metric based upon a state of charge of the wireless network device and a transmission parameter of the route discovery packet. The link metric increases as the state of charge decreases. The transmission parameter comprises energy used to transmit the route discovery packet. The link metric is proportional to the energy used and inversely related to the state of charge. The mesh routing module transmits the route discovery packet using increasing amounts of energy.

A method for a wireless network device comprises wirelessly receiving route discovery packets; and storing direct and reverse entries in a forwarding table based upon the route discovery packets, each of the entries including a destination address, a next hop address, and a metric. The metric of the direct entries corresponds to a route from the wireless network device to the destination address. The metric of the reverse entries corresponds to a route from the destination address to the wireless network device.

In other features, the method further comprises receiving a first route discovery packet including a metric and a source address from a first wireless network device; and creating a reverse entry in the forwarding table. The next hop address of the reverse entry is set to an address of the first wireless network device, the destination address of the reverse entry is set to the source address of the first route discovery packet, and the metric of the reverse entry is set to the metric of the first route discovery packet.

In further features, the method further comprises receiving a route reply packet including a reply destination address wirelessly; identifying ones of the reverse entries that have the reply destination address; and transmitting the route reply packet to the next hop address of a selected one of the identified reverse entries. The selected one of the identified reverse entries is selected based upon the metrics of the identified reverse entries.

In still other features, the reverse entries each include a sequence number, and further comprises setting the sequence number of the reverse entry to a sequence number received in the first route discovery packet. The route reply packet includes a reply sequence number, and further comprises choosing ones of the identified reverse entries that have the reply sequence number; and selecting one of the chosen reverse entries based upon the metrics of the chosen reverse entries.

In other features, the method further comprises receiving a route request for a requested destination address; identifying ones of the direct entries that have the requested destination address; and selectively responding to the route request with the next hop address of a selected one of the identified direct entries. The selected one of the identified direct entries is selected based upon the metrics of the identified direct entries. The direct entries of the forwarding table include an expiration indicator. The selected one of the identified direct entries is selected based upon the expiration indicators of the identified direct entries.

In further features, the method further comprises receiving a first route discovery packet including a metric; determining a link metric based upon a state of charge of the wireless network device and a transmission parameter of a second route discovery packet; determining a cumulative metric based upon a received metric and the link metric; and transmitting the second route discovery packet wirelessly to a first wireless network device, the second route discovery packet including the cumulative metric.

In still other features, the link metric increases as the state of charge decreases. The transmission parameter comprises energy used to transmit the second route discovery packet. The link metric is proportional to the energy used and inversely related to the state of charge. The method further comprises transmitting the second route discovery packet using increasing amounts of energy.

A computer program stored for use by a processor for operating a wireless network device comprises wirelessly receiving route discovery packets; and storing direct and reverse entries in a forwarding table based upon the route discovery packets, each of the entries including a destination address, a next hop address, and a metric. The metric of the direct entries corresponds to a route from the wireless network device to the destination address. The metric of the reverse entries corresponds to a route from the destination address to the wireless network device.

In other features, the computer program further comprises receiving a first route discovery packet including a metric and a source address from a first wireless network device; and creating a reverse entry in the forwarding table. The next hop address of the reverse entry is set to an address of the first wireless network device, the destination address of the reverse entry is set to the source address of the first route discovery packet, and the metric of the reverse entry is set to the metric of the first route discovery packet.

In further features, the computer program further comprises receiving a route reply packet including a reply destination address wirelessly; identifying ones of the reverse entries that have the reply destination address; and transmitting the route reply packet to the next hop address of a selected one of the identified reverse entries. The selected one of the identified reverse entries is selected based upon the metrics of the identified reverse entries.

In still other features, the reverse entries each include a sequence number, and further comprises setting the sequence number of the reverse entry to a sequence number received in the first route discovery packet. The route reply packet includes a reply sequence number, and further comprises choosing ones of the identified reverse entries that have the reply sequence number; and selecting one of the chosen reverse entries based upon the metrics of the chosen reverse entries.

In other features, the computer program further comprises receiving a route request for a requested destination address; identifying ones of the direct entries that have the requested destination address; and selectively responding to the route request with the next hop address of a selected one of the identified direct entries. The selected one of the identified direct entries is selected based upon the metrics of the identified direct entries. The direct entries of the forwarding table include an expiration indicator. The selected one of the identified direct entries is selected based upon the expiration indicators of the identified direct entries.

In further features, the computer program further comprises receiving a first route discovery packet including a metric; determining a link metric based upon a state of charge of the wireless network device and a transmission parameter of a second route discovery packet; determining a cumulative metric based upon a received metric and the link metric; and transmitting the second route discovery packet wirelessly to a first wireless network device, the second route discovery packet including the cumulative metric.

In still other features, the link metric increases as the state of charge decreases. The transmission parameter comprises energy used to transmit the second route discovery packet. The link metric is proportional to the energy used and inversely related to the state of charge. The computer program further comprises transmitting the second route discovery packet using increasing amounts of energy.

A wireless network device comprises forwarding table means for storing direct and reverse entries each including a destination address, a next hop address, and a metric. The metric of the direct entries corresponds to a route from the wireless network device to the destination address. The metric of the reverse entries corresponds to a route from the destination address to the wireless network device; and mesh routing means for wirelessly receiving route discovery packets and for creating corresponding entries in the forwarding table means.

In other features, the mesh routing means wirelessly receives a first route discovery packet including a metric and a source address from a second wireless network device and creates a reverse entry in the forwarding table means. The next hop address of the reverse entry is set to an address of the second wireless network device, the destination address of the reverse entry is set to the source address of the first route discovery packet, and the metric of the reverse entry is set to the metric of the first route discovery packet.

In further features, the mesh routing means wirelessly receives a route reply packet including a reply destination address, identifies ones of the reverse entries that have the reply destination address, and transmits the route reply packet to the next hop address of a selected one of the identified reverse entries. The mesh routing means selects the selected one of the identified reverse entries based upon the metrics of the identified reverse entries.

In still other features, the reverse entries each include a sequence number. The mesh routing means sets the sequence number of the reverse entry to a sequence number received in the first route discovery packet. The route reply packet includes a reply sequence number. The mesh routing means chooses ones of the identified reverse entries that have the reply sequence number and selects one of the chosen reverse entries based upon the metrics of the chosen reverse entries.

In other features, the mesh routing means receives a route request for a requested destination address, identifies ones of the direct entries that have the requested destination address, and selectively responds to the route request with the next hop address of a selected one of the identified direct entries. The mesh routing means selects the selected one of the identified direct entries based upon the metrics of the identified direct entries. The direct entries of the forwarding table means include an expiration indicator. The mesh routing means selects the selected one of the identified direct entries based upon the expiration indicators of the identified direct entries.

In further features, the mesh routing means transmits a route discovery packet including a cumulative metric to a second wireless network device, determines the cumulative metric based upon a received metric and a link metric, and determines the link metric based upon a state of charge of the wireless network device and a transmission parameter of the route discovery packet.

In still other features, the link metric increases as the state of charge decreases. The transmission parameter comprises energy used to transmit the route discovery packet. The link metric is proportional to the energy used and inversely related to the state of charge. The mesh routing means transmits the route discovery packet using increasing amounts of energy.

A wireless network device comprises a physical layer (PHY) module that sends and receives packets wirelessly; a first media access control (MAC) module that wirelessly communicates with a second wireless network device in an ad-hoc mode via the PHY module; and a second MAC module that wirelessly communicates with an access point in an infrastructure mode via the PHY module.

In other features, the wireless network device further comprises a bridge module that facilitates transmission of packets between the first MAC module and the second MAC module. The wireless network device further comprises a physical dispatcher module that directs packets from the PHY module to one of the first MAC module and the second MAC module. The second MAC module operates according to IEEE 802.11.

In further features, the second MAC module is selectively deactivated when the wireless network device is not within range of the access point. The first MAC module communicates with the second wireless network device using packets including immediate source and destination addresses and final source and destination addresses. The wireless network device replies to an Address Resolution Protocol (ARP) request received from the access point, the ARP request requesting an address of the second wireless network device.

In still other features, the wireless network device further comprises a forwarding table that includes destination entries and best next hop entries. The destination entries each include a destination address field and a best next hop field, the best next hop entries each include a receiver address field, and the best next hop field of each of the destination entries points to one of the best next hop entries. The best next hop entries each include a power information field corresponding to a power state of a wireless network device designated by the receiver address field.

In other features, the destination entries each include a metric field, and further comprises a mesh routing module that communicates with the first MAC module and that populates the forwarding table. The metric field is based upon an energy cost for transmitting a packet along a corresponding route. The energy cost is calculated with a variable dependence upon state of charge of wireless network devices along the corresponding route.

A method for a wireless network device comprises wirelessly communicating with a first wireless network device in an ad-hoc mode via a physical layer (PHY) module; and wirelessly communicating with an access point in an infrastructure mode via the PHY module.

In other features, the method further comprises operating in the infrastructure mode according to IEEE 802.11. The method further comprises selectively deactivating the infrastructure mode when out of range of the access point. The method further comprises communicating with the first wireless network device using packets including immediate source and destination addresses and final source and destination addresses.

In further features, the method further comprises replying to an Address Resolution Protocol (ARP) request received from the access point, the ARP request requesting an address of the first wireless network device. The method further comprises storing destination entries and best next hop entries in a forwarding table. The destination entries each include a destination address field and a best next hop field, the best next hop entries each include a receiver address field, and the best next hop field of each of the destination entries points to one of the best next hop entries.

In still other features, the best next hop entries each include a power information field corresponding to a power state of a wireless network device designated by the receiver address field. The destination entries each include a metric field. The metric field is based upon an energy cost for transmitting a packet along a corresponding route. The energy cost is calculated with a variable dependence upon state of charge of wireless network devices along the corresponding route.

A computer program stored for use by a processor for operating a wireless network device comprises wirelessly communicating with a first wireless network device in an ad-hoc mode via a physical layer (PHY) module; and wirelessly communicating with an access point in an infrastructure mode via the PHY module.

In other features, the computer program further comprises operating in the infrastructure mode according to IEEE 802.11. The computer program further comprises selectively deactivating the infrastructure mode when out of range of the access point. The computer program further comprises communicating with the first wireless network device using packets including immediate source and destination addresses and final source and destination addresses.

In further features, the computer program further comprises replying to an Address Resolution Protocol (ARP) request received from the access point, the ARP request requesting an address of the first wireless network device. The computer program further comprises storing destination entries and best next hop entries in a forwarding table. The destination entries each include a destination address field and a best next hop field, the best next hop entries each include a receiver address field, and the best next hop field of each of the destination entries points to one of the best next hop entries.

In still other features, the best next hop entries each include a power information field corresponding to a power state of a wireless network device designated by the receiver address field. The destination entries each include a metric field. The metric field is based upon an energy cost for transmitting a packet along a corresponding route. The energy cost is calculated with a variable dependence upon state of charge of wireless network devices along the corresponding route.

A wireless network device comprises physical layer (PHY) means for sending and receiving packets wirelessly; first media access control (MAC) means for wirelessly communicating with a second wireless network device in an ad-hoc mode via the PHY means; and second MAC means for wirelessly communicating with an access point in an infrastructure mode via the PHY means.

In other features, the wireless network device further comprises bridging means for facilitating transmission of packets between the first MAC means and the second MAC means. The bridging means selectively transmits a packet to the second MAC means when a destination address of the packet corresponds to a wireless network device in communication with the access point. The wireless network device further comprises physical dispatching means for directing packets from the PHY means to one of the first MAC means and the second MAC means.

In further features, the second MAC means operates according to IEEE 802.11. The second MAC means is selectively deactivated when the wireless network device is not within range of the access point. The first MAC means communicates with the second wireless network device using packets including immediate source and destination addresses and final source and destination addresses. The wireless network device replies to an Address Resolution Protocol (ARP) request received from the access point, the ARP request requesting an address of the second wireless network device.

In still other features, the wireless network device further comprises forwarding table means for storing destination entries and best next hop entries. The destination entries each include a destination address field and a best next hop field, the best next hop entries each include a receiver address field, and the best next hop field of each of the destination entries points to one of the best next hop entries. The best next hop entries each include a power information field corresponding to a power state of a wireless network device designated by the receiver address field.

In other features, the destination entries each include a metric field, and further comprises mesh routing means that communicates with the first MAC means and that populates the forwarding table means. The metric field is based upon an energy cost for transmitting a packet along a corresponding route. The energy cost is calculated with a variable dependence upon state of charge of wireless network devices along the corresponding route.

A wireless network device comprises a physical layer (PHY) module that sends and receives packets wirelessly; and a mesh routing module that receives a first packet including a metric and a source address from a second wireless network device via the PHY module, that transmits a second packet including a cumulative metric to a third wireless network device via the PHY module, that determines the cumulative metric based upon the metric from the first packet and a link metric, and that determines the link metric based upon a state of charge of the wireless network device and a transmission parameter of the second packet.

In other features, the link metric increases as the state of charge decreases. The transmission parameter comprises energy used to transmit the second packet. The link metric is proportional to the energy used and inversely related to the state of charge. The mesh routing module transmits the second packet using increasing amounts of energy.

In further features, the wireless network device further comprises a forwarding table that stores direct and reverse entries each including a destination address, a next hop address, and a metric. The metric of the direct entries corresponds to a route from the wireless network device to the destination address. The metric of the reverse entries corresponds to a route from the destination address to the wireless network device.

In still other features, the mesh routing module creates a reverse entry in the forwarding table based on the first packet. The next hop address of the reverse entry is set to an address of the second wireless network device, the destination address of the reverse entry is set to the source address of the first packet, and the metric of the reverse entry is set to the metric of the first packet.

In other features, the mesh routing module receives a route reply packet including a reply destination address via the PHY module, identifies ones of the reverse entries that correspond to the reply destination address, and transmits the reply packet to the next hop address of a selected one of the identified reverse entries. The mesh routing module selects the selected one of the identified reverse entries based upon the metrics of the identified reverse entries.

In further features, the reverse entries each include a sequence number associated with the destination address. The reply packet includes a reply sequence number, the mesh routing module chooses ones of the identified reverse entries having the reply sequence number, and the mesh routing module selects one of the chosen reverse entries based upon the metrics of the chosen reverse entries.

In still other features, the mesh routing module receives a route request for a requested destination address, identifies ones of the direct entries having the requested destination address, and responds to the route request with the next hop address of a selected one of the identified direct entries. The mesh routing module selects the selected one of the identified direct entries based upon the metrics of the identified direct entries. The direct entries of the forwarding table include an expiration indicator. The mesh routing module selects the selected one of the identified direct entries based upon the expiration indicators of the identified direct entries.

A method for a wireless network device comprises receiving a first packet wirelessly from a first wireless network device, the first packet including a metric and a source address; determining a link metric based upon a state of charge of the wireless network device and a transmission parameter of a second packet; determining a cumulative metric based upon the metric from the first packet and the link metric; and transmitting the second packet wirelessly to a second wireless network device, the second packet including the cumulative metric.

In other features, the link metric increases as the state of charge decreases. The transmission parameter comprises energy used to transmit the second packet. The link metric is proportional to the energy used and inversely related to the state of charge. The method further comprises transmitting the second packet using increasing amounts of energy.

In further features, the method further comprises storing direct and reverse entries in a forwarding table, each of the entries including a destination address, a next hop address, and a metric. The metric of the direct entries corresponds to a route from the wireless network device to the destination address. The metric of the reverse entries corresponds to a route from the destination address to the wireless network device.

In still other features, the method further comprises creating a reverse entry in the forwarding table based on the first packet. The next hop address of the reverse entry is set to an address of the first wireless network device, the destination address of the reverse entry is set to the source address of the first packet, and the metric of the reverse entry is set to the metric of the first packet.

In other features, the method further comprises receiving a route reply packet including a reply destination address from the second wireless network device; identifying ones of the reverse entries that correspond to the reply destination address; and transmitting the reply packet to the next hop address of a selected one of the identified reverse entries. The selected one of the identified reverse entries is selected based upon the metrics of the identified reverse entries.

In further features, the reverse entries each include a sequence number associated with the destination address. The reply packet includes a reply sequence number, and further comprises choosing ones of the identified reverse entries having the reply sequence number; and selecting one of the chosen reverse entries based upon the metrics of the chosen reverse entries.

In still other features, the method further comprises receiving a route request for a requested destination address; identifying ones of the direct entries having the requested destination address; and responding to the route request with the next hop address of a selected one of the identified direct entries. The selected one of the identified direct entries is selected based upon the metrics of the identified direct entries. The direct entries of the forwarding table include an expiration indicator. The selected one of the identified direct entries is selected based upon the expiration indicators of the identified direct entries.

A computer program stored for use by a processor for operating a wireless network device comprises receiving a first packet wirelessly from a first wireless network device, the first packet including a metric and a source address; determining a link metric based upon a state of charge of the wireless network device and a transmission parameter of a second packet; determining a cumulative metric based upon the metric from the first packet and the link metric; and transmitting the second packet wirelessly to a second wireless network device, the second packet including the cumulative metric.

In other features, the link metric increases as the state of charge decreases. The transmission parameter comprises energy used to transmit the second packet. The link metric is proportional to the energy used and inversely related to the state of charge. The computer program further comprises transmitting the second packet using increasing amounts of energy.

In further features, the computer program further comprises storing direct and reverse entries in a forwarding table, each of the entries including a destination address, a next hop address, and a metric. The metric of the direct entries corresponds to a route from the wireless network device to the destination address. The metric of the reverse entries corresponds to a route from the destination address to the wireless network device.

In still other features, the computer program further comprises creating a reverse entry in the forwarding table based on the first packet. The next hop address of the reverse entry is set to an address of the first wireless network device, the destination address of the reverse entry is set to the source address of the first packet, and the metric of the reverse entry is set to the metric of the first packet.

In other features, the computer program further comprises receiving a route reply packet including a reply destination address from the second wireless network device; identifying ones of the reverse entries that correspond to the reply destination address; and transmitting the reply packet to the next hop address of a selected one of the identified reverse entries. The selected one of the identified reverse entries is selected based upon the metrics of the identified reverse entries.

In further features, the reverse entries each include a sequence number associated with the destination address. The reply packet includes a reply sequence number, and further comprises choosing ones of the identified reverse entries having the reply sequence number; and selecting one of the chosen reverse entries based upon the metrics of the chosen reverse entries.

In still other features, the computer program further comprises receiving a route request for a requested destination address; identifying ones of the direct entries having the requested destination address; and responding to the route request with the next hop address of a selected one of the identified direct entries. The selected one of the identified direct entries is selected based upon the metrics of the identified direct entries. The direct entries of the forwarding table include an expiration indicator. The selected one of the identified direct entries is selected based upon the expiration indicators of the identified direct entries.

A wireless network device comprises physical layer (PHY) means for sending and receiving packets wirelessly; and mesh routing means for receiving a first packet including a metric and a source address from a second wireless network device via the PHY means, for transmitting a second packet including a cumulative metric to a third wireless network device via the PHY means, for determining the cumulative metric based upon the metric from the first packet and a link metric, and for determining the link metric based upon a state of charge of the wireless network device and a transmission parameter of the second packet.

In other features, the link metric increases as the state of charge decreases. The transmission parameter comprises energy used to transmit the second packet. The link metric is proportional to the energy used and inversely related to the state of charge. The mesh routing means transmits the second packet using increasing amounts of energy.

In further features, the wireless network device further comprises forwarding table means for storing direct and reverse entries each including a destination address, a next hop address, and a metric. The metric of the direct entries corresponds to a route from the wireless network device to the destination address. The metric of the reverse entries corresponds to a route from the destination address to the wireless network device.

In still other features, the mesh routing means creates a reverse entry in the forwarding table means based on the first packet. The next hop address of the reverse entry is set to an address of the second wireless network device, the destination address of the reverse entry is set to the source address of the first packet, and the metric of the reverse entry is set to the metric of the first packet.

In other features, the mesh routing means receives a route reply packet including a reply destination address via the PHY means, identifies ones of the reverse entries that correspond to the reply destination address, and transmits the reply packet to the next hop address of a selected one of the identified reverse entries. The mesh routing means selects the selected one of the identified reverse entries based upon the metrics of the identified reverse entries.

In further features, the reverse entries each include a sequence number associated with the destination address. The reply packet includes a reply sequence number. The mesh routing means chooses ones of the identified reverse entries having the reply sequence number. The mesh routing means selects one of the chosen reverse entries based upon the metrics of the chosen reverse entries.

In still other features, the mesh routing means receives a route request for a requested destination address, identifies ones of the direct entries having the requested destination address, and responds to the route request with the next hop address of a selected one of the identified direct entries. The mesh routing means selects the selected one of the identified direct entries based upon the metrics of the identified direct entries. The direct entries of the forwarding table means include an expiration indicator. The mesh routing means selects the selected one of the identified direct entries based upon the expiration indicators of the identified direct entries.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7A is a flowchart depicting exemplary steps taken in sending a packet from mesh node X to node A;

FIG. 7B is a flowchart depicting exemplary steps taken in sending a packet from node A to mesh node X;

FIG. 13A is a table depicting an exemplary format of a route request (RREQ) packet;

FIG. 13B is a table depicting an exemplary format of a route reply (RREP) packet;

FIG. 18 is a table depicting exemplary forwarding table contents;

FIG. 19 is a table depicting exemplary configuration parameters for operation of a mesh node;

DETAILED DESCRIPTION

Figure 1:
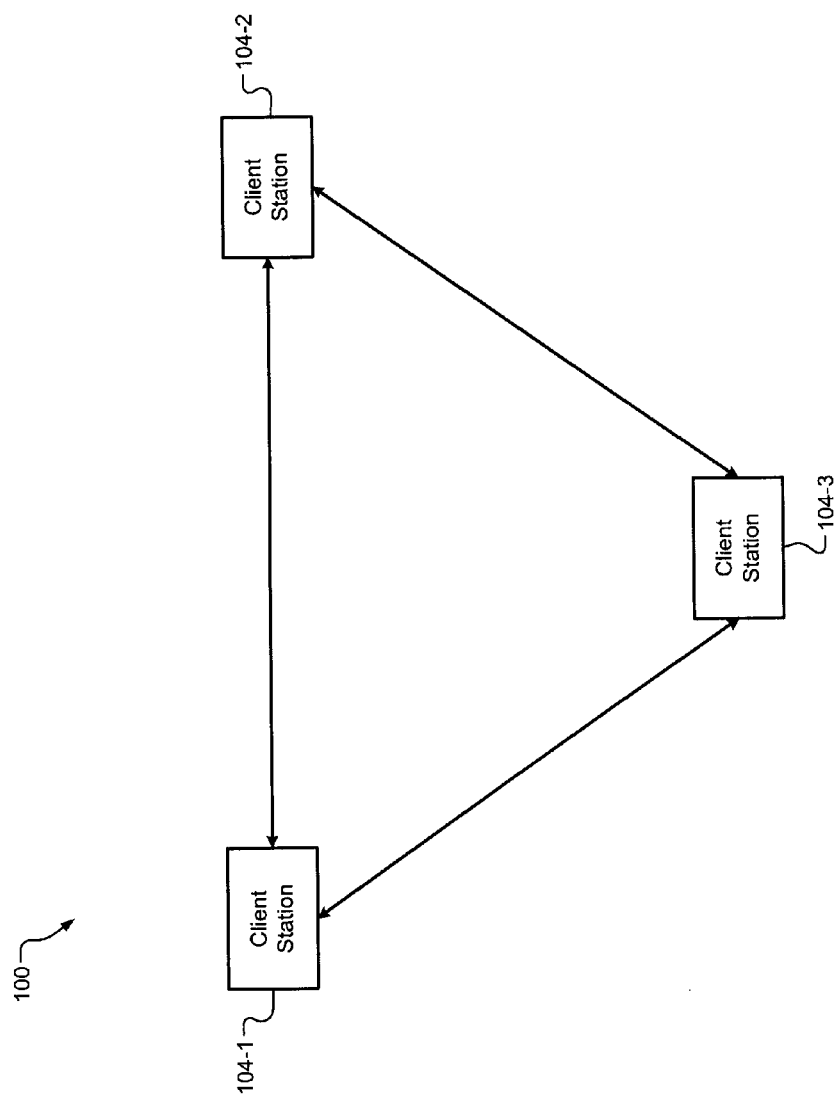
FIG. 1 is a functional block diagram of an ad-hoc wireless network according to the prior art.
Figure 2:
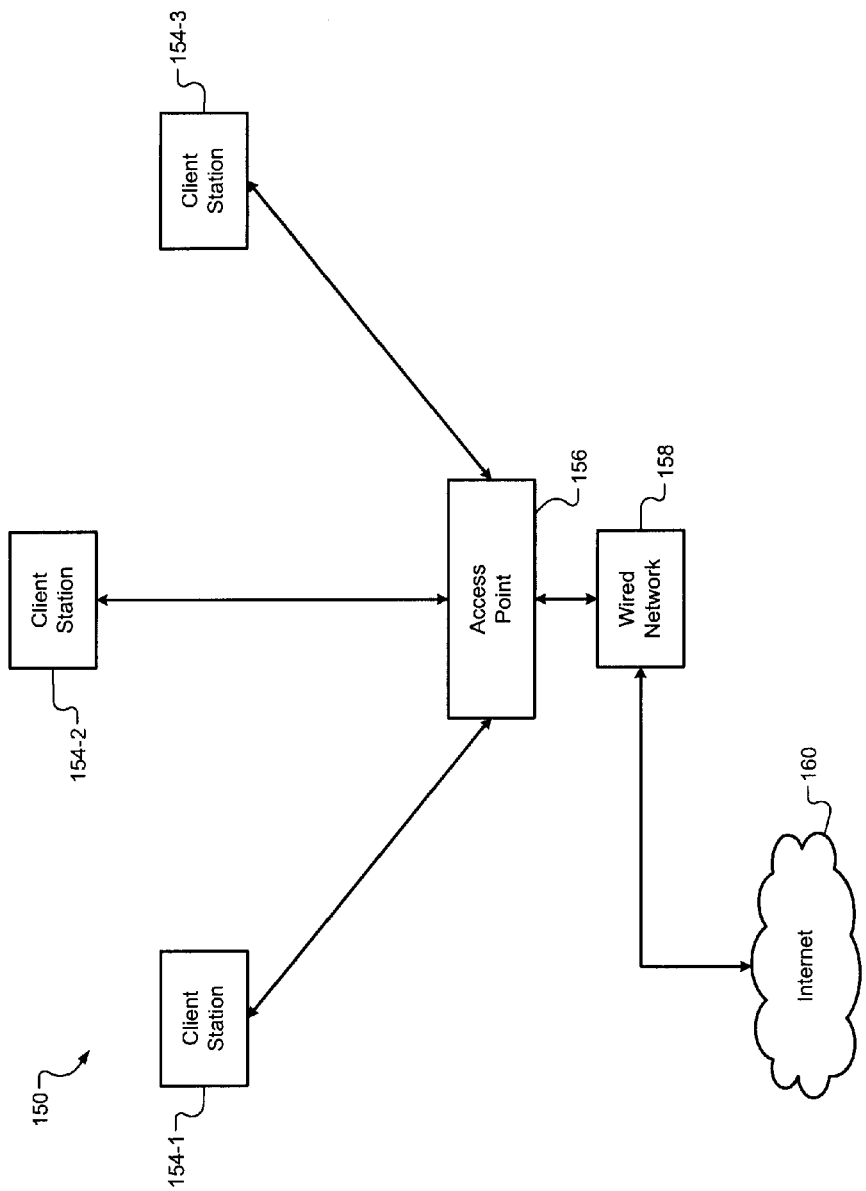
FIG. 2 is a functional block diagram of an exemplary infrastructure mode wireless network according to the prior art.
Figure 3:
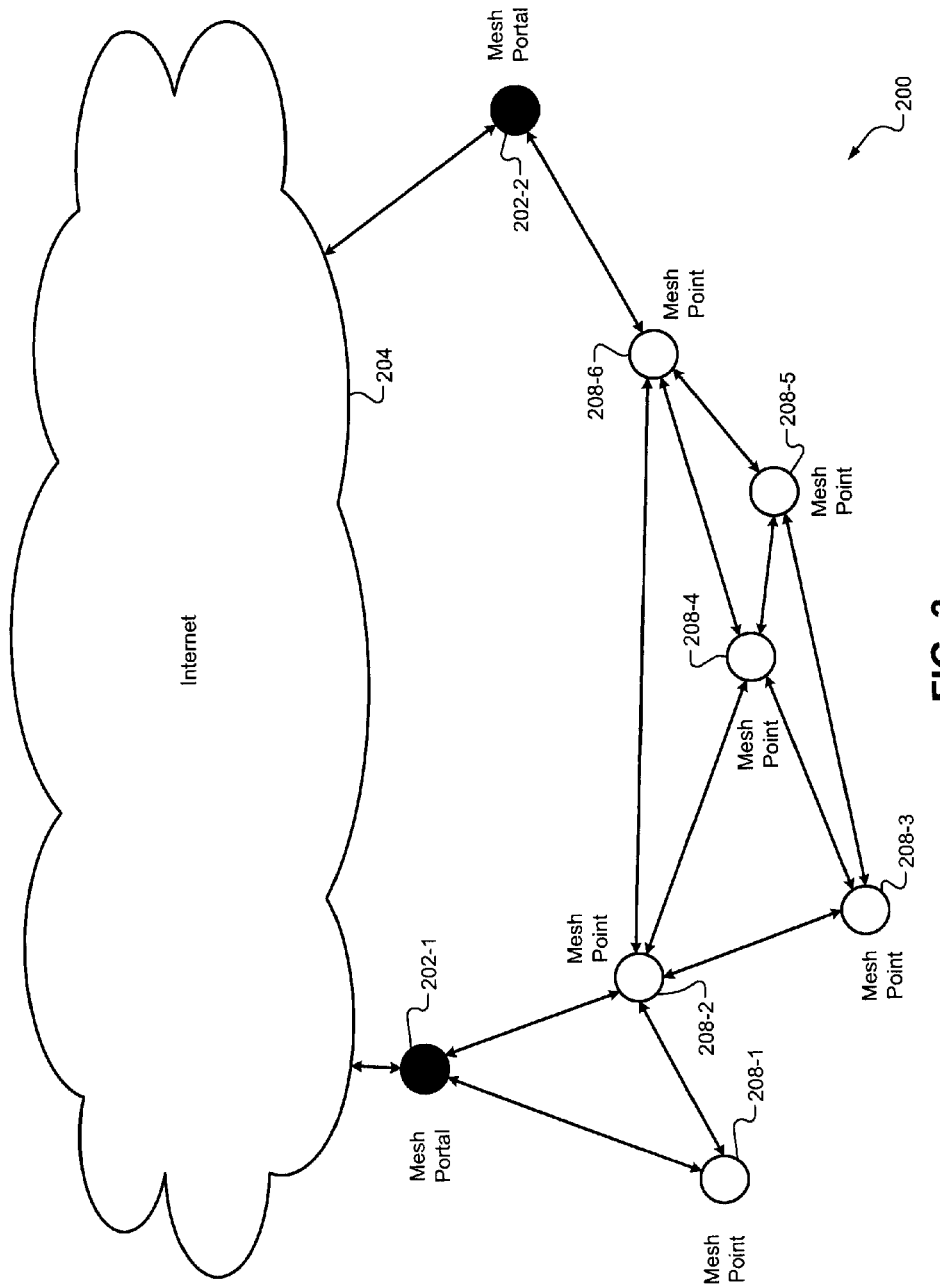
FIG. 3 is a functional block diagram of an exemplary mesh network according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 4:
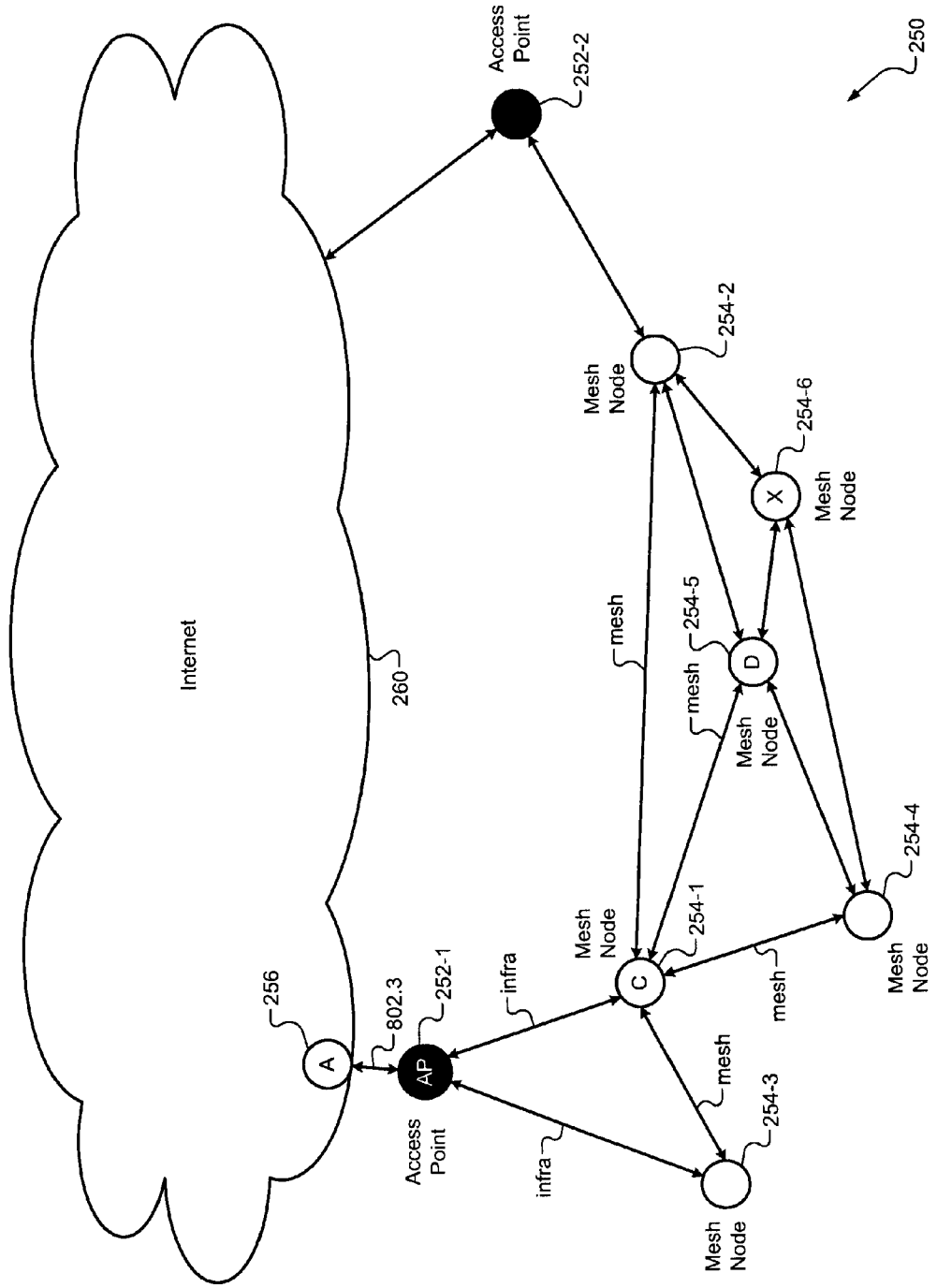
FIG. 4 is a functional block diagram of an exemplary mesh network according to the principles of the present disclosure.

Referring now to FIG. 4, a functional block diagram of an exemplary mesh network 250 according to the principles of the present disclosure is presented. The mesh network 250 includes access points (APs) 252-1 and 252-2 and mesh nodes 254-1, 254-2, 254-3, 254-4, 254-5, and 254-6. AP 252-1 communicates with a wired node 256 via a wired protocol, such as IEEE 802.3. For purposes of clarity, wired node 256 is labeled as A, AP 252-1 is labeled as AP, and mesh nodes 254-1, 254-5, and 254-6 are labeled as C, D, and X, respectively.

In the mesh network 250, mesh nodes 254 communicate with each other in mesh mode, which may be similar to the ad-hoc mode defined by IEEE 802.11, with modifications as described herein. Mesh mode operation is described in more detail with respect to Draft IEEE standard P802.11s, which is hereby incorporated by reference in its entirety. The mesh nodes 254 communicate with the APs 252 in infrastructure mode. Because the APs 252 naturally operate in infrastructure mode, they do not need to be modified to interact with the mesh nodes 254.

Mesh nodes 254 that are in communication with the APs 252 (in this example, mesh nodes 254-1, 254-2, and 254-3) provide translation between infrastructure mode used by the APs 252 and mesh mode used by the other mesh nodes 254. In this mode of operation, mesh nodes 254-1, 254-2, and 254-3 can be referred to as mesh portals. In various implementations, any of the mesh nodes 254 can act as mesh portals when in communication with one of the APs 252.

Figure 5:
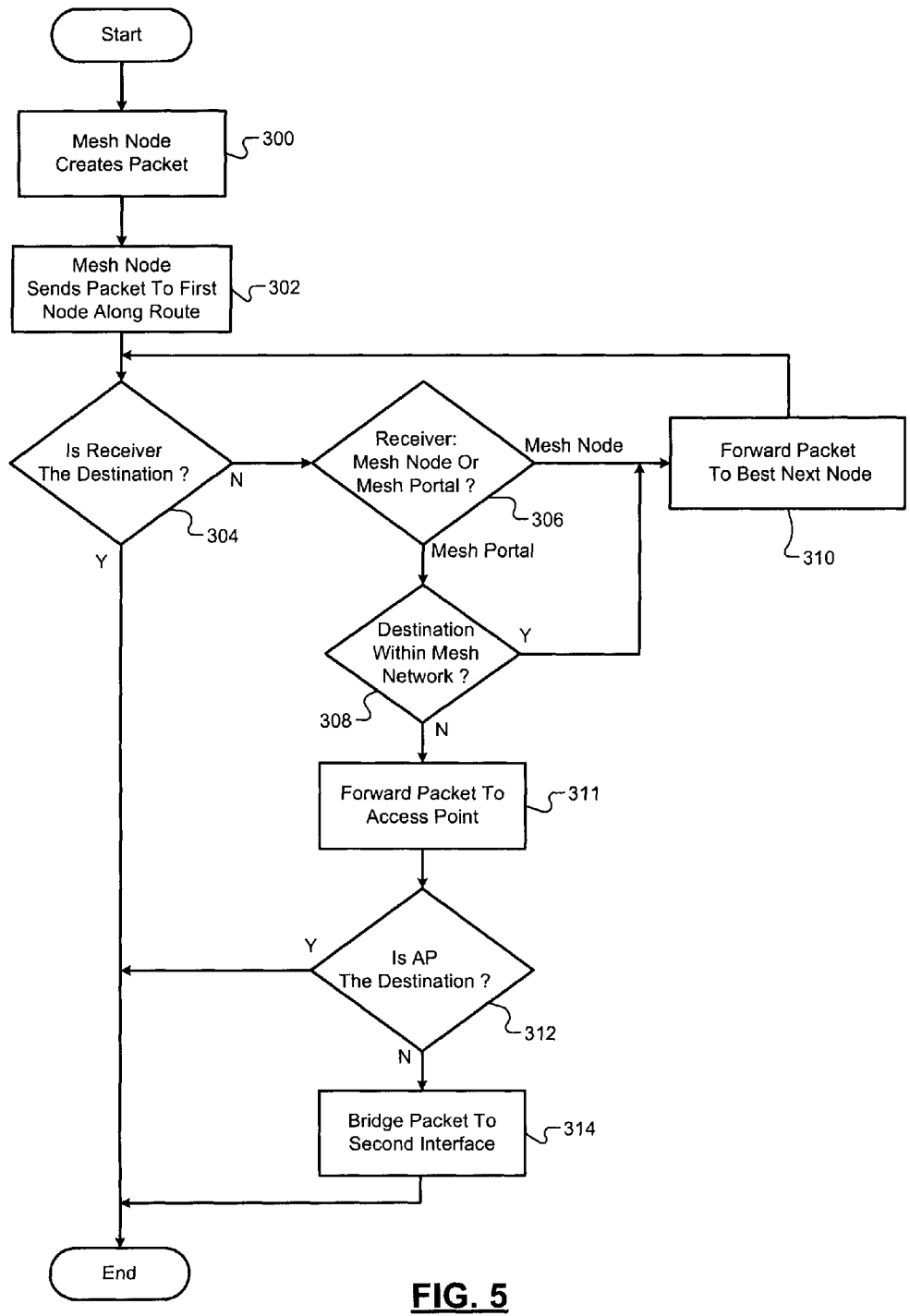
FIG. 5 is a flowchart depicting exemplary steps performed in sending a packet through the mesh network.

Referring now to FIG. 5, a flowchart depicts exemplary steps performed in sending a packet through the mesh network 250. Control begins in step 300, where a mesh node (such as one of the mesh nodes 254) creates a packet. The destination media access control (MAC) address of the packet may be determined based upon a destination internet protocol (IP) address for the packet using such technologies as address resolution protocol (ARP). The destination IP address may be obtained through domain name system (DNS) resolution of a domain name requested by an application.

Control continues in step 302, where the mesh node determines, as explained in further detail below, the first node in the best route to the destination address. The mesh node then sends the packet to that first node. Control continues in step 304, where the mesh node that receives the packet checks whether it is the final destination of the packet. If so, control ends; otherwise, control transfers to step 306. In various implementations, the final destination of the packet includes a layer 2 address. The packet may also include an ultimate layer 3 destination address. In step 306, if the receiver is acting as a mesh portal, control transfers to step 308; otherwise, control transfers to step 310.

In step 310, the mesh node forwards the packet to the next mesh node in the best route to the final destination, and control returns to step 304. In step 308, the mesh portal determines if the final destination is within the mesh network. Control may initiate a mesh route discovery to determine if the final destination is within the mesh network. If the final destination is within the mesh network, control transfers to step 310; otherwise, control transfers to step 311.

In step 311, the mesh portal forwards the packet to the AP. Control continues in step 312, where the AP determines if it is the final destination of the packet. If so, control ends; otherwise, control continues in step 314. In step 314, the AP bridges the packet to a second interface. This second interface may implement IEEE 802.3, and may be part of a distribution system (DS). The packet has now left the mesh network, and control ends.

Figure 6:
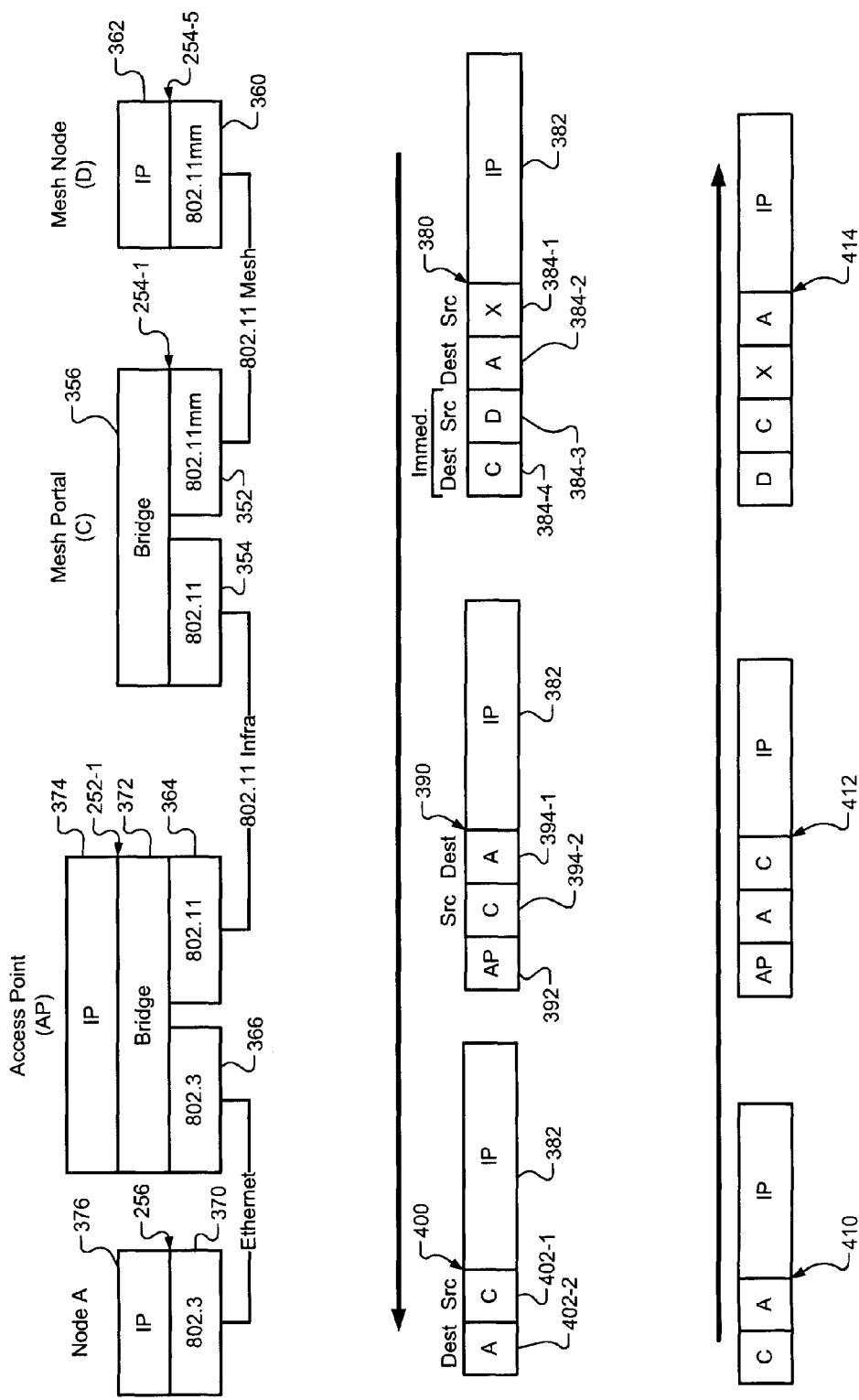
FIG. 6 is a functional block diagram depicting exemplary components of the mesh network and the routing of two exemplary packets within the mesh network.

Referring now to FIG. 6, a functional block diagram depicts exemplary implementations of selected components of the mesh network 250 and the routing of two exemplary packets within the mesh network 250. Selected devices from FIG. 4 are shown, including mesh node D 254-5, mesh portal C 254-1, AP 252-1, and node A 256.

Mesh portal C 254-1 includes an 802.11 mesh mode (referred to hereinafter as 802.11mm) interface 352 and an IEEE 802.11 infrastructure interface 354. The interfaces 352 and 354 are connected via a bridge 356. Mesh node D 254-5 may be a mesh portal, such as mesh portal C 254-1, operating in a mode where the IEEE 802.11 interface and the bridge are deactivated. In this way, mesh nodes can become mesh portals when they are within range of an AP.

Mesh node D 254-5 includes an 802.11mm interface 360. Mesh node D 254-5 includes an IP routing layer 362, which communicates with the 802.11mm interface 360. AP 252-1 includes an IEEE 802.11 infrastructure interface 364, which is in communication with the IEEE 802.11 infrastructure interface 354 of mesh portal C 254-1.

AP 252-1 may also include a wired interface 366, which communicates with a wired interface 370 of node A 256. The wired interfaces 366 and 370 may implement IEEE 802.3. The interfaces 364 and 366 of AP 252-1 are connected via a bridge 372. AP 252-1 may additionally serve as a routing gateway, and may consequently include an IP routing layer 374. Node A 256 may include wired and/or wireless interfaces (not shown), which communicate with the wired interface 370 via an IP routing layer 376.

In order for mesh node X 254-6 (not shown in FIG. 6) to send a packet to node A 256, node X 254-6 sends a packet to the first hop on the best route to node A 256. Mesh node D 254-4 may be a hop on the best route to node A 256, and so receives the packet. Mesh node D 254-5 forwards the packet, depicted graphically in FIG. 6 at 380, to mesh portal C 254-1. The packet 380 may contain four addresses, such as is described in IEEE 802.11 for packets sent within a distribution system (DS).

The packet 380 includes an encapsulated IP payload 382 and a layer 2 (MAC) header, of which four addresses 384-1, 384-2, 384-3, and 384-4 are shown. Addresses 384-1 and 384-2 are the final layer 2 source and destination, respectively. In this case, the original source is mesh node X 254-6 and the final destination is node A 256. Addresses 384-3 and 384-4 are immediate source and destination addresses, respectively, also called transmitter and receiver addresses, respectively.

The packet 380 is received by the 802.11mm interface 352 of mesh portal C 254-1. The bridge 356 receives the packet 380 from the 802.11mm interface 352. The bridge 356 then determines from which interface the packet should be sent. In various implementations, the bridge 356 creates address tables by passively monitoring traffic, such as address resolution protocol (ARP) messages. The bridge 356 determines that the packet 380 should be sent from the IEEE 802.11 infrastructure interface 354. The IEEE 802.11 infrastructure interface 354 modifies the header information of the packet 380, thereby creating a new packet 390.

The packet 390 includes the encapsulated IP payload 382 and a layer 2 header, of which the BSSID 392 and destination and source addresses 394-1 and 394-2 are shown. In various implementations, the BSSID 392 is the MAC address of AP 252-1, denoted as AP in FIG. 6. The packet 390 is received by AP 252-1 at its IEEE 802.11 infrastructure interface 364. The packet is passed to the bridge 372. The bridge 372, in turn, determines from which interface the packet 390 should be sent. In this case, the packet is destined for node A 256, which is accessible on the wired interface 366.

The bridge 372 passes the packet 390 to the wired interface 366, which modifies the header information of the packet 390, creating a new packet 400. The packet 400 includes the encapsulated IP payload 382 and a layer 2 header, of which source and destination addresses 402-1 and 402-2 are shown. The packet 400 is received by node A 256. Node A 256 may act as a gateway to an external network, such as the Internet. Node A 256 may be the final layer 2 destination of the packet, while the ultimate destination of the packet is stored in layer 3 (such as in a header of the encapsulated IP payload 382).

Node A 256 can reply by sending a packet to mesh node X 254-6. Node A 256 sends a packet 410 to AP 252-1. AP 252-1 forwards a modified packet 412, based upon the packet 410, to mesh portal C 254-1. Mesh portal C 254-1 forwards a modified packet 414, based upon the packet 412, to mesh node D 254-5. This route assumes that mesh portal C 254-1 has determined that mesh node D 254-5 is the best next hop to reach mesh node X 254-6. Mesh node D 254-5 then forwards a modified version of the packet 414 on to mesh node X 254-6.

Referring now to FIG. 7A, a flowchart depicts exemplary steps performed in sending a packet from mesh node X 254-6 to node A 256. Control begins in step 450, where mesh node X 254-6 creates a packet with a final destination of node A 256. In step 452, mesh node X 254-6 determines the first hop on the best route to node A 256, a process described in further detail below. Control continues in step 454, where mesh node X 254-6 sends a 4-address IEEE 802.11 packet to mesh node D 254-5. In step 456, mesh node D 254-5 determines the next hop in the best route to node A 256.

Control continues in step 458, where mesh node D 254-5 sends a 4-address IEEE 802.11 packet to mesh portal C 254-1. In step 460, mesh portal C 254-1 determines that node A 256 is accessible via its IEEE 802.11 infrastructure interface 354. Control continues in step 462, where mesh portal C 254-1 sends a 3-address IEEE 802.11 packet to AP 252-1. In step 464, AP 252-1 determines that node A is accessible via its wired interface 366. In step 466, AP 252-1 sends a 2-address packet to node A 256, and control ends.

Referring now to FIG. 7B, a flowchart depicts exemplary steps performed in sending a packet from node A 256 to mesh node X 254-6. Control begins in step 480, where node A 256 creates a packet having an ultimate layer 3 destination address of mesh node X 254-6. Node A 256 may determine the MAC address of mesh node X 254-6 from the ultimate layer 3 destination address by sending an address resolution protocol (ARP) request.

One of the functions the mesh node may perform when acting as a mesh portal (connected to an AP) is to send proxy ARP replies on behalf of mesh nodes that are reachable through the mesh portal. The mesh portal can proxy ARP for those mesh nodes that it contains within its forwarding table. In the exemplary mesh network 250 of FIG. 4, mesh portal C 254-1 can respond when it receives an ARP request for the layer 2 address of mesh node X 254-6. Mesh portal C 254-1 may send a proxy ARP reply with its own physical address.

In step 482, node A 256 sends a 2-address packet to AP 252-1. This packet designates mesh portal C 254-1 as the destination because mesh portal C 254-1 responded to the ARP request on behalf of mesh node X 254-6. In step 484, AP 252-1 determines that mesh portal C 254-1 is accessible via the IEEE 802.11 infrastructure interface 364 of AP 252-1. In step 486, AP 252-1 sends a 3-address IEEE 802.11 packet to mesh portal C 254-1. In step 488, mesh portal C 254-1 analyzes the layer 3 header of the packet and determines that the actual destination of the packet is mesh node X 254-6.

In step 490, mesh portal C 254-1 determines that mesh node X 254-6 is accessible via the 802.11mm interface 352. In step 492, mesh portal C 254-1 determines the first hop on the best route to mesh node X 254-6, which may be mesh node D 254-5. In step 494, mesh portal C 254-1 sends a 4-address IEEE 802.11 packet to mesh node D 254-5. In step 496, mesh node D 254-5 sends a 4-address IEEE 802.11 packet to mesh node X 254-6, and control ends.

Figure 8:
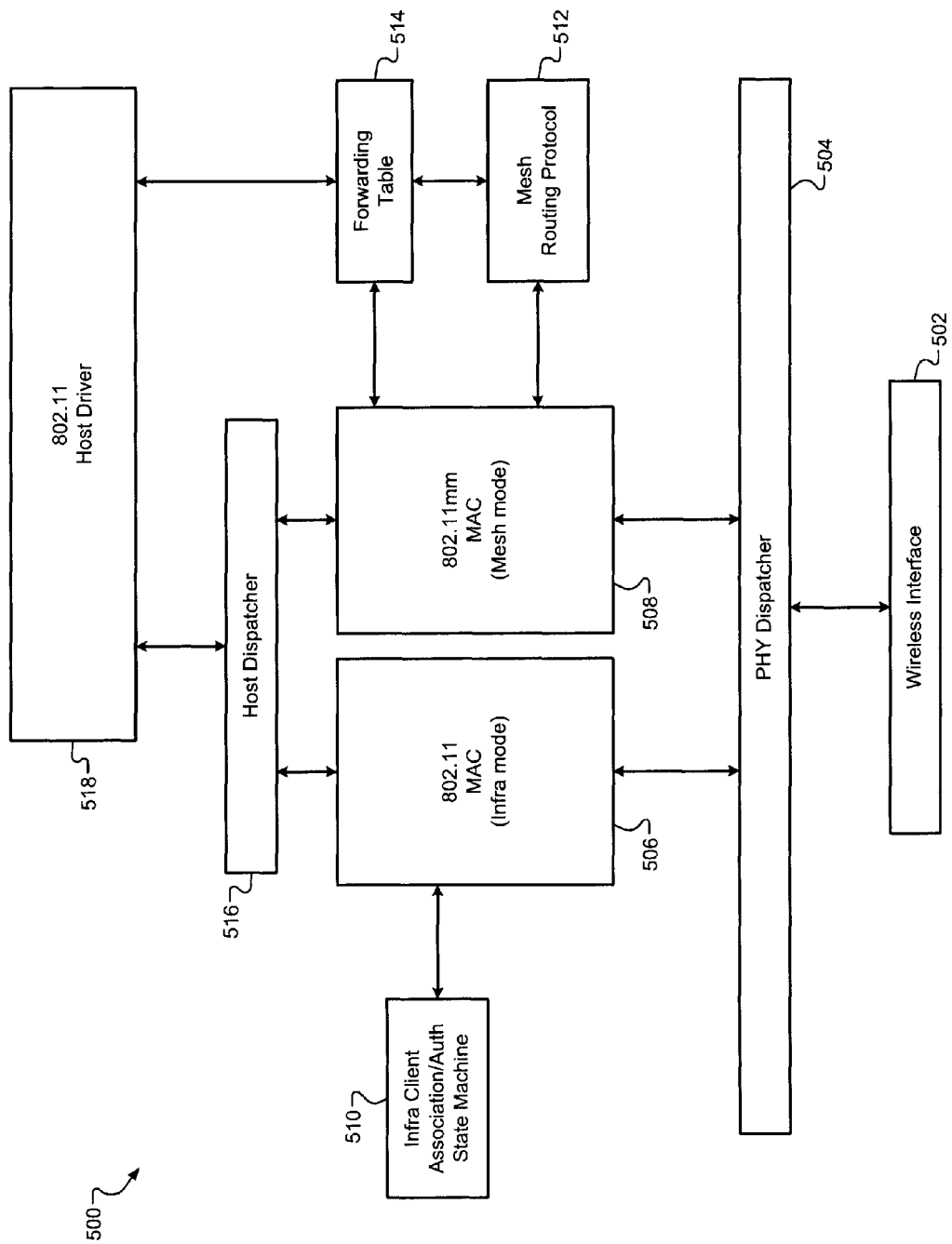
FIG. 8 is a functional block diagram of a network module of an exemplary mesh node.

Referring now to FIG. 8, a functional block diagram depicts a network module 500 of an exemplary mesh node according to the principles of the present disclosure. The network module 500 includes a wireless interface 502, which communicates with a physical layer (PHY) dispatcher 504. The PHY dispatcher 504 communicates with an infrastructure mode IEEE 802.11 media access controller (MAC) 506 and an 802.11mm MAC 508.

The infrastructure mode IEEE 802.11 MAC 506 communicates with a state machine module 510 that controls infrastructure client association and authorization. The 802.11mm MAC 508 communicates with a mesh routing protocol module 512 and a forwarding table 514, which also communicate with each other. The infrastructure mode and 802.11mm MACs 506 and 508 each communicate with a host dispatcher 516. The host dispatcher 516 includes infrastructure bridge and mesh bridge tables, which indicate whether destination addresses are serviced by the infrastructure mode or 802.11mm MACs 506 and 508, respectively.

An IEEE 802.11 host driver 518 communicates with the host dispatcher 516 and the forwarding table 514. The IEEE 802.11 host driver 518 communicates with a host (not shown), such as a laptop computer or portable media player. When the mesh node is not acting as a mesh portal, the infrastructure mode IEEE 802.11 MAC 506 and the state machine module 510 may be deactivated.

Figure 9:
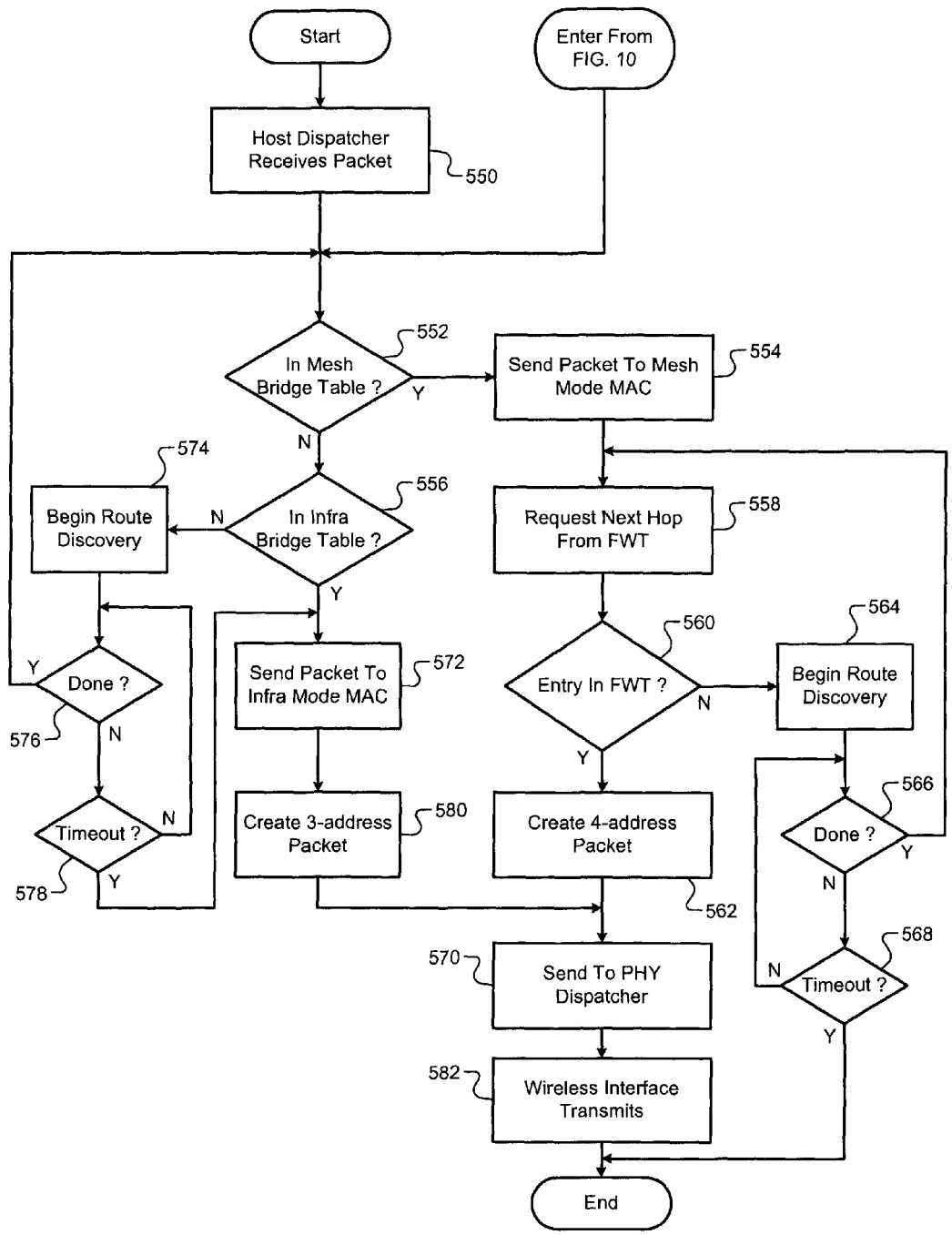
FIG. 9 is a flowchart depicting exemplary operation of the network module in transmitting a packet.

Referring now to FIG. 9, a flowchart depicts exemplary operation of the network module 500 when transmitting a packet. Control begins in step 550, where the host dispatcher 516 receives a packet. Control continues in step 552, where the host dispatcher 516 determines whether the packet's destination address is in the mesh bridge table. If so, control transfers to step 554; otherwise, control transfers to step 556.

In step 554, the host dispatcher 516 sends the packet to the 802.11mm MAC 508. Control then continues in step 558, where the 802.11mm MAC 508 requests next hop information from the forwarding table (FWT) 514. In step 560, if there is an entry for this destination address in the FWT 514, control transfers to step 562; otherwise, control transfers to step 564.

In step 564, the 802.11mm MAC 508 requests the mesh routing protocol module 512 to begin route discovery to the destination address. Control continues in step 566, where control determines if route discovery has completed. If so, control returns to step 558; otherwise, control transfers to step 568.

In step 568, control determines whether a route discovery timeout has elapsed. Route discovery may fail, for example, if the destination node is asleep or no longer within the mesh network. If the route discovery timeout has elapsed, control may signal a routing failure and subsequently end; otherwise, control returns to step 566.

In step 562, an entry for the address has been found in the forwarding table 514, and a 4-address 802.11mm packet is created. Control then continues in step 570. Referring now to step 556, control determines whether the destination address is contained in the infrastructure bridge table. If so, control continues in step 572; otherwise, control transfers to step 574. In step 574, route discovery is begun. Control transfers to step 576. If route discovery has completed, control returns to step 552; otherwise, control continues in step 578. In step 578, control determines if a route discovery timeout has elapsed.

If the route discovery timeout has elapsed, the packet destination is likely not in the mesh network, so control transfers to step 572 to forward the packet to the AP. Otherwise, control returns to step 576. In various implementations, control transfers to step 572 while still waiting for route discovery to complete or time out. In this way, the packet can be forwarded to the infrastructure network without waiting for route discovery to complete. If the packet's destination is found on one of the networks, route discovery may be abandoned on the other.

In step 572, the packet is sent to the infrastructure mode IEEE 802.11 MAC 506. Control continues in step 580, where a 3-address packet is created and control continues in step 570. In step 570, the created packet is sent to the PHY dispatcher 504. Control continues in step 582, where the wireless interface 502 transmits the packet. Control then ends.

Figure 10:
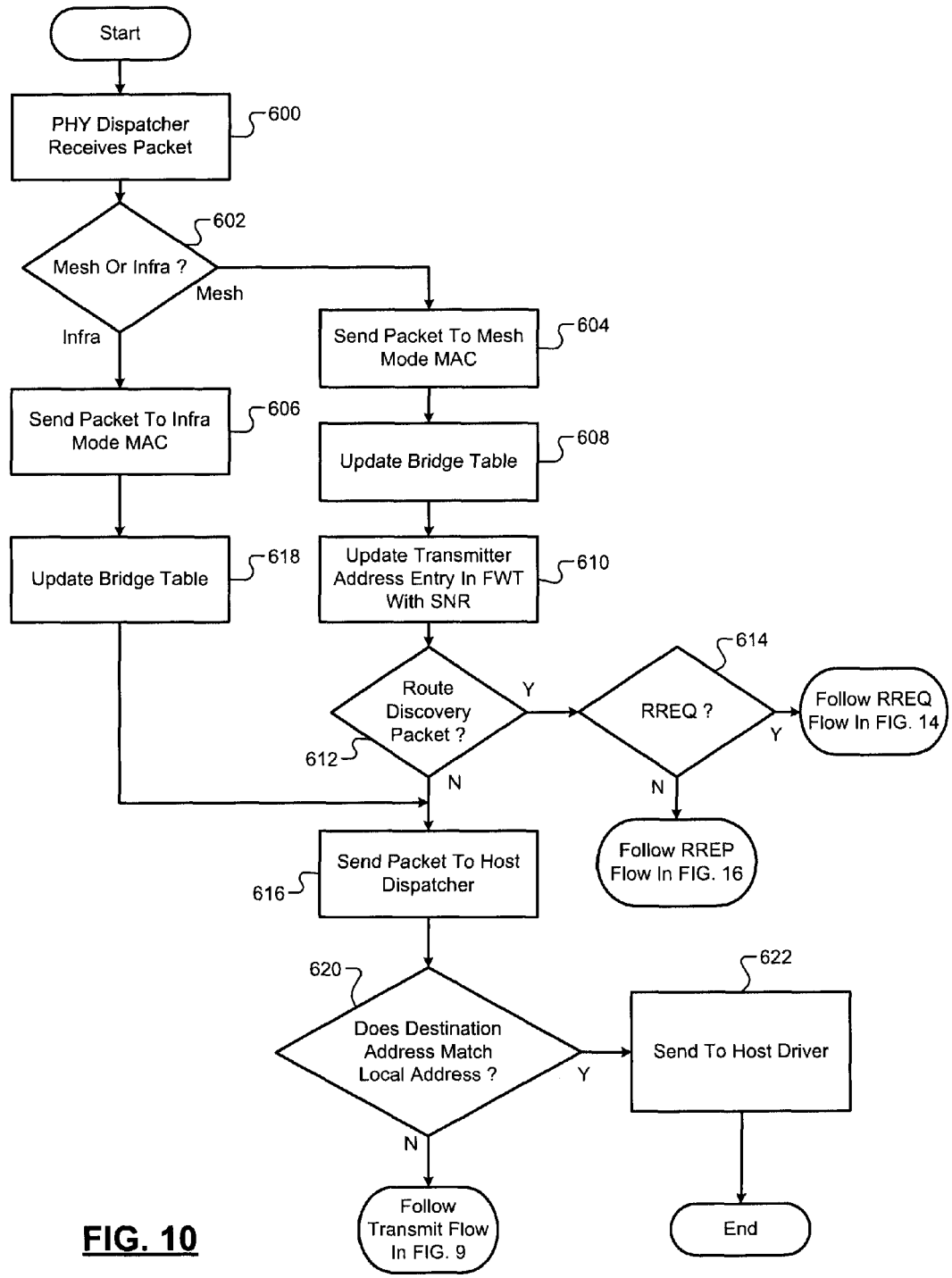
FIG. 10 is a flowchart depicting exemplary operation of the network module in receiving a packet.

Referring now to FIG. 10, a flowchart depicts exemplary operation of the network module 500 when receiving a packet. Control begins in step 600, where the PHY dispatcher 504 receives a packet from the wireless interface 502. Control continues in step 602, where control determines whether the packet is from the mesh interface or from the infrastructure interface. In various implementations, this is determined by examining the BSSID of the packet.

In various implementations, the ToDs and FromDs fields indicate whether the packet is a mesh packet or an infrastructure packet. Setting both ToDs and FromDs to one, which is normally reserved for a distribution system (DS) packet, may signify a mesh packet. In keeping with IEEE 802.11, a ToDs of 0 and a FromDs of 1 may indicate that the packet is arriving from an AP. If the packet is a mesh packet, control transfers to step 604; otherwise, the packet is an infrastructure packet, and control transfers to step 606.

In step 604, the packet is sent to the 802.11mm MAC 508. Control continues in step 608, where the mesh mode bridge table may be updated based upon data, such as a source address, within the received packet. Control continues in step 610, where the entry in the forwarding table 514 corresponding to the transmitter address of the received packet is updated with the signal to noise ratio (SNR) experienced by the received packet. Control continues in step 612.

In step 612, control determines whether the packet is a route discovery packet. If so, control transfers to step 614; otherwise, control transfers to step 616. In step 614, control determines what type of route discovery packet the current packet is. If the packet is a route request (RREQ) packet, control continues with the RREQ handling flow presented below with respect to FIG. 14. If the packet is a route reply (RREP) packet, control continues with the RREP handling flow presented below with respect to FIG. 16. In various implementations, other types of route discovery packets can be accommodated.

Referring now to step 606, the packet is sent to the infrastructure mode IEEE 802.11 MAC 506. Control continues in step 618, where the infrastructure bridge table may be updated to reflect information obtained from the packet, such as a source address. Control continues in step 616. In step 612, the packet is sent to the host dispatcher 516.

Control continues in step 620, where the host dispatcher 516 determines whether the packet's destination address matches the network address of the network module 500. If so, the packet has arrived at its destination, and control transfers to step 622; otherwise, the packet is forwarded according to the transmission flowchart of FIG. 9. In step 622, the packet is sent to the IEEE 802.11 host driver 518, and control ends.

Figure 11:
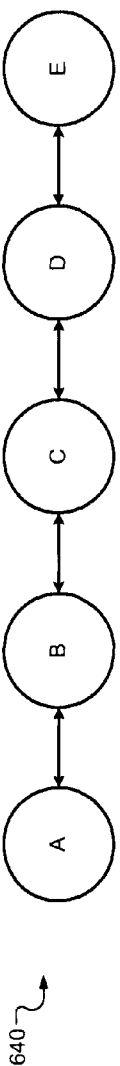
FIG. 11 is a graphical and tabular representation of an exemplary route discovery process.

Referring now to FIG. 11, a graphical and tabular representation of an exemplary route discovery process is presented. An exemplary mesh network 640 includes nodes A, B, C, D, and E. The nodes are functionally arranged in a line, with each node able to communicate with the neighbor on either side. If node A wants to determine a route to node E, node A can broadcast a route request (RREQ) with a destination address of E.

This RREQ is received by node B, and is broadcast by node B and received by node C. Node C broadcasts an RREQ, received by node D, and node D broadcasts an RREQ, received by node E. Upon receiving the RREQ, node E transmits a route reply (RREP) to node A along a path opposite to that by which the RREQ was received. Table 642 presents exemplary RREQ handling by each node, and table 644 presents exemplary RREP handling by each node.

Tables 642 and 644 include step numbers in a generally chronological order. The steps progress from the original RREQ being generated to the final RREP being received. Within each step, the corresponding node performs a series of operations. Beginning in step one, node A generates an RREQ. The contents of the RREQ are shown in square brackets. The transmitter address is A, the source address is A, the destination address is E, and the metric associated with the RREQ is $\alpha_1$.

The metric is a measure of the quality of the link over which the RREQ is being sent. In various implementations, the metric for a link is determined by the transmitting node and included in the RREQ prior to transmission. When the transmitting node determines the metric, the metric between two nodes may be asymmetrical.

The metric stored in the RREQ may be a combination of the link metric and a received metric. In this way, the metric stored in the RREQ is a cumulative metric from the source of the route request to the current node. The link metric may depend upon a data rate achievable over the link. When forwarding the RREQ, the node sets the metric field to be the lower of the metric received and the link metric. The lower metric is chosen because the lowest data rate link restricts the data rate of the entire route.

In various implementations, the metric may depend upon the amount of power required to transmit the RREQ to the receiving node and/or the battery life of the transmitting node. The metric may represent a cumulative energy cost of sending a representative packet (such as the RREQ). When forwarding the RREQ, the node may then set the metric field to be the sum of the metric received and the link metric. The link metric may represent an energy cost for transmitting from the current node, and may be determined by the following equation:

$$EnergyCost = \frac{\sum\limits_{retransmissions} ScalingFactor(\text{retransmission}) \times XmitPwr(\text{Rate}) \times \text{duration}(\text{Rate})}{\text{cost}(BatteryCondition)}$$

The equation sums the energy cost for the initial transmission and any retransmissions. A node may transmit the RREQ at a first power level, and then retransmit the RREQ at increasing power levels. The metric will therefore be different for each of the transmitted RREQs. The first RREQ received by a neighbor node will contain the lowest metric RREQ that the neighbor node was able to receive.

The ScalingFactor( ) function depends upon the retransmission number, and may decrease from one as the retransmission number increases. The XmitPwr( ) function depends upon data rate, returns the amount of power expended during transmission per unit of time, and increases as the data rate increases. The duration( ) function depends upon data rate, returns the amount of time required to transmit the representative packet, and decreases as the data rate increases. The cost( ) function depends upon the condition of the node's battery, and decreases as the node's remaining battery life decreases.

The amount of influence the battery condition has on the cost( ) function determines how heavily battery life will affect the reported energy cost of the present node. When an energy cost metric is employed, the best route can be determined by selecting the route with the lowest energy cost. When a node receives multiple RREQs, the node may select the RREQ with the lowest energy cost, add the energy cost for the current link, and transmit the resulting RREQ.

Referring again to step one of table 642, the RREQ with metric $\alpha_1$ is broadcast from node A to the broadcast address (*), as indicated within the curly braces. In the next operation, node A creates a new RREQ with an updated metric $\alpha_2$, and broadcasts this RREQ. Node A continues broadcasting RREQs until a final RREQ with metric $\alpha_N$ is broadcast. The RREQs may be broadcast with increasing power. This increasing power required to transmit the RREQ may be reflected in an increasing metric.

The metric $\alpha_1$ may include the power required to transmit the RREQ divided by the battery state of node A. Likewise, the metric $\alpha_2$ may include the power required to transmit the second RREQ divided by the battery state of node A. The metric $\alpha_2$ will likely be greater than the metric $\alpha_1$, as the transmit power increases and the battery state of node A remains the same or decreases.

In step two, node B receives one of the RREQs broadcast by node A. Node B keeps the first RREQ received from node A and discards further RREQs with less preferable metrics. In this way, the stored RREQ contains the lowest possible metric able to reach node B. The metric received is denoted by $\alpha_a$, which is one of the metrics from $\alpha_1$ to $\alpha_N$.

Because connections are assumed to be bidirectional, the fact that an RREQ was received by node B from node A indicates that node B can also transmit a packet to node A. Node B may therefore create an entry in its forwarding table (FWT) based on the received RREQ. The FWT entry includes the source address A, a reverse status, the transmitter address A, and the metric $\alpha_a$.

The FWT entry is labeled as a reverse route because the metric $\alpha_a$ received in the RREQ corresponds to the metric from node A to node B, not from node B to node A. For example, if metrics are dependent on battery life, when nodes A and B have different battery lives, the metric from node A to node B will be different than the metric from node B to node A. The FWT entry therefore indicates that node B can reach node A, but does not include the actual metric from node B to node A.

In the next operation, node B broadcasts an RREQ from node B to the broadcast address (*), as indicated within the curly braces. Node B may determine a link metric for broadcasting the RREQ. The link metric may be based upon the battery state of node B and the power required to transmit the RREQ. The link metric may be combined with the metric received in the RREQ from node A. If the metric for node B to broadcast the RREQ is $\beta_1$, the total metric stored within the RREQ may be $\alpha_a+\beta_1$.

Node B continues broadcasting RREQs with increasing power levels. The final RREQ that is broadcast has a cumulative metric of $\alpha_a+\beta_N$. Note that the transmitter address of the RREQs is now B, while the source and destination addresses remain A and E, respectively. In step three, node C receives one of the RREQs broadcast by node B.

The received metric is one of the cumulative metrics from $\alpha_a+\beta_1$ to $\alpha_a+\beta_N$. The received metric is referred to as $\alpha_a+\beta_b$, where $\beta_b$ is one of the link metrics from $\beta_1$ to $\beta_N$. Node C adds a reverse FWT entry having a source address of node A, a transmitter address of node B, and a cumulative metric of $\alpha_a+\beta_b$. This FWT entry indicates that to reach node A, node C can transmit a packet to node B.

The reverse FWT entry indicates that a packet from node A to node C will experience a metric of $\alpha_a+\beta_b$, though the metric from node C to node A is unknown. Node C then broadcasts RREQs, adding its own metric beginning with $\gamma_1$. In step four, node B receives an RREQ from node C having a metric of $\alpha_a+\beta_b+\gamma_c$. Node D adds a reverse FWT entry indicating that node A is reachable via node C, and stores the received metric.

Node D then broadcasts RREQs, increasing the metric by $\delta_1$ through $\delta_N$. In step five, node E receives an RREQ from node D having a metric of $\alpha_a+\beta_b+\gamma_c+\delta_d$. Node E adds a corresponding reverse FWT entry to A. Because the RREQ was destined for node E, node E responds to the RREQ with an RREP. Node E thus begins RREP operation, such as is shown in table 644.

In step five of table 644, node E determines the best route from node A to node E. This may be done by selecting the reverse FWT entry to node A that has the best metric. As the only reverse FWT entry having a destination address of node A in this example, the reverse FWT entry indicating node D as the next hop, with metric $\alpha_a+\beta_b+\gamma_c+\delta_d$, is chosen.

Now that node E has determined the best route from node A to node E, node E can inform node A of the best route as well as the associated metric. Node E thus generates an RREP and transmits it to the next hop specified by the selected reverse FWT entry, node D. The contents of the RREP are included in square brackets: node A is the destination address, node E is the source address, and the cumulative metric from node A to node E is $\alpha_a+\beta_b+\gamma_c+\delta_d$.

Node D receives the RREP and selects a corresponding reverse FWT entry. As explained in more detail below, additional information may be stored with reverse FWT entries to ensure that the RREP is matched to the correct reverse FWT entry. If the reverse FWT entry matches the RREP, a metric from node D to node E can now be calculated. The metric from node A to node D is already stored in the reverse FWT entry as $\alpha_a+\beta_b+\gamma_c$. The metric from node A to node E is contained in the RREP: $\alpha_a+\beta_b+\gamma_c+\delta_d$.

Therefore, the metric from node D to node E can be determined by subtracting the metric from node A to node D from the metric from node A to node E. A direct FWT entry is then created. The direct FWT entry has a destination of node E with a next hop address of node E and a metric of $\delta_d$. This direct FWT entry could not have been added when node D broadcast the RREQs. Metrics including $\delta_1$ to $\delta_N$ were broadcast, and the RREP is necessary to indicate that node E received the RREQ including the metric $\delta_d$.

An RREP is transmitted from node D to node C including the same source and destination addresses and cumulative metric as the RREP sent from node E. In various implementations, the RREPs also include the metric experienced by the RREP en route from node E to node A. Node C matches the RREP to a reverse FWT entry having the same destination as the RREP, node A.

Node C also adds a direct FWT entry to node E via node D. Node C then transmits an RREP to node B. Node B receives the RREP, matches the RREP to a reverse FWT entry, and creates a direct FWT entry to node E. Node B then transmits an RREP to node A. Node A receives the RREP and adds a direct FWT entry to node E. Now that route discovery is completed, node A knows that a packet for node E can be sent to node B, and the cumulative metric experienced to node E will be approximately $\alpha_a+\beta_b+\gamma_c+\delta_d$.

Figure 12A:
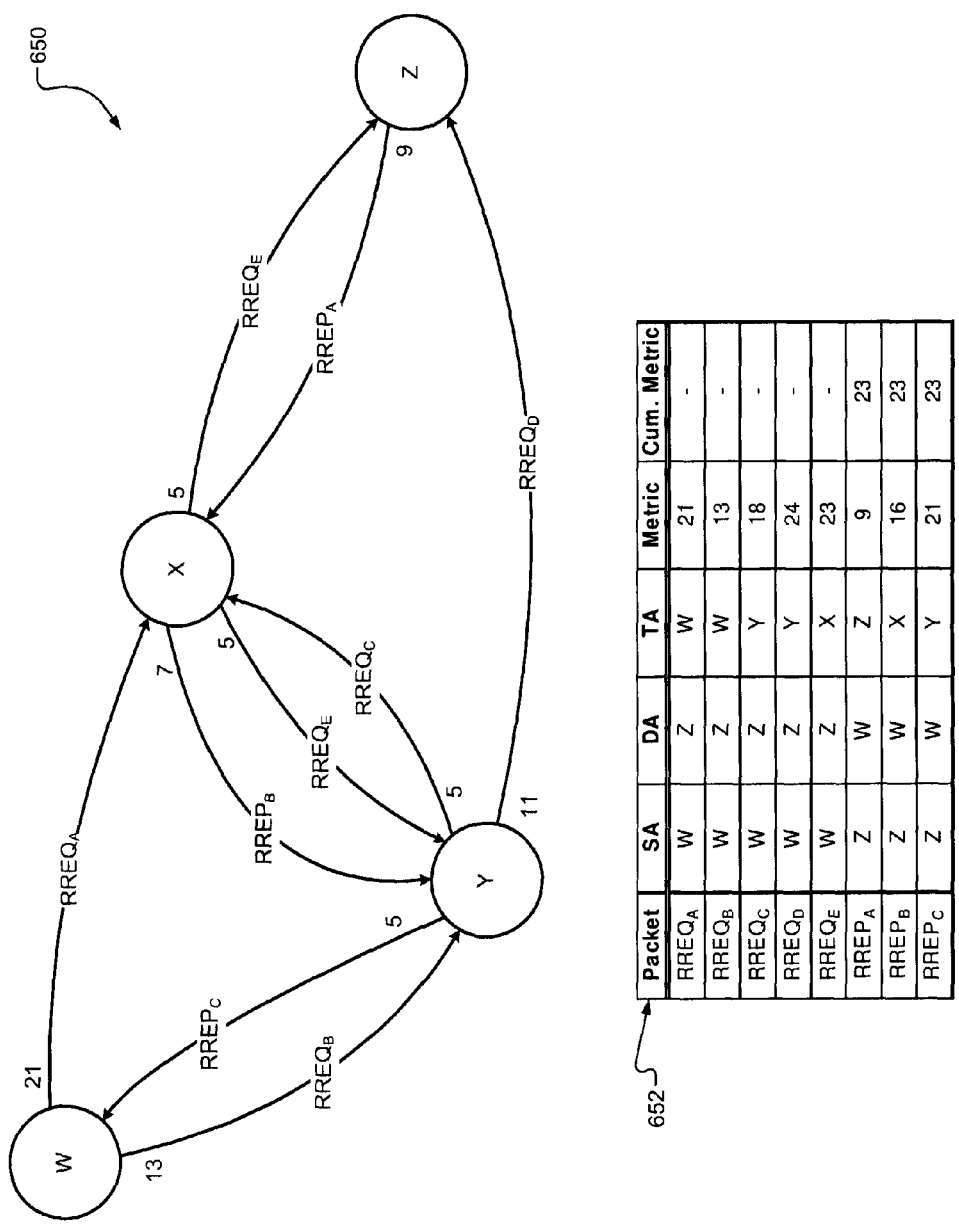
FIG. 12A is a graphical depiction of route discovery messages in an exemplary mesh network.

Referring now to FIG. 12A, a graphical depiction of route discovery messages in an exemplary mesh network 650 is depicted. The mesh network 650 includes nodes W, X, Y, and Z. In the example shown in FIG. 12A, node W is seeking a route to node Z. Node W begins by creating an RREQ having a source address of W and a destination address of Z.

Because node W is transmitting the RREQ, the transmitter address is node W. Node X receives $RREQ_A$, and node Y receives $RREQ_B$. $RREQ_A$ and $RREQ_B$ may correspond to different power-level transmissions, as described in more detail in FIG. 11. Each route discovery packet is graphically depicted as a curved line from the transmitter to the receiver. The curved lines are labeled at their transmitter ends with exemplary link metric numbers.

For example, the metric for $RREQ_A$ is 21, while the metric for $RREQ_B$ is 13. In various implementations, $RREQ_B$ was transmitted earlier and with a lower power (and therefore a lower metric) than $RREQ_A$. $RREQ_B$ was received by node Y but may not have been received by node X because of node X's greater distance from node W. The route discovery packets, including $RREQ_A$ and $RREQ_B$, are presented in tabular form in table 652.

In various implementations, if node W has established communication links with node X and node Y, RREQ packets may be unicast to nodes X and Y. Power may be increased in the RREQs until the corresponding receiver acknowledges receipt of the RREQ.

After node Y receives $RREQ_B$, node Y waits for a predetermined amount of time to see if RREQs are received via other routes from node W. In this example, node Y does not receive other RREQs during this window, and so determines that the best route from node W to node Y is direct transmission to node Y. Node Y then broadcasts its own increasing power-level RREQs, including $RREQ_C$ and $RREQ_D$.

$RREQ_C$ is received by node X, and may include a link metric of 5. The total metric within $RREQ_C$ is therefore 13+5, or 18. The link metric of 5 from node Y to node X may be a function of the power required to transmit $RREQ_C$ and may also be a function of the battery state of node Y. $RREQ_D$ is received by node Z and includes a metric of 24. The metric of 24 includes the metric of 13 from node W to node Y and the link metric of 11 from node Y to node Z.

Node X may still have been waiting for RREQs originating from node W to arrive via other routes. Node X has now received an RREQ via two routes: directly from node W, and via node Y. Node X determines that the route from node W to node Y to node X has a superior metric of 18 compared to the route directly from node W to node X, which has a metric of 21. Node X therefore generates RREQs including the better metric of 18.

$RREQ_E$ may be received by both nodes Y and Z. $RREQ_E$ includes the previous metric of 18 plus the link metric of 5 for transmitting $RREQ_E$, yielding a total metric of 23. Because node Y has already transmitted an RREQ, node Y may discard any later received RREQs, such as $RREQ_E$. Before discarding $RREQ_E$, node Y may update its forwarding table, as shown in more detail with respect to FIG. 12B.

Node Z has now received two RREQs from node W with two different metrics, 23 and 24. Node Z selects the more favorable metric of 23, meaning that the best route from Node W to node Z is via nodes Y and X. Node Z transmits an RREP to the next hop along the reverse of the best route. Therefore $RREP_A$ is sent from node Z to node X.

$RREP_A$ includes the selected cumulative metric of 23. $RREP_A$ may also include a metric experienced from node Z to node X. For example, this metric may be 9. Node X receives $RREP_A$ and transmits $RREP_B$ to the next hop in the reverse of the best route from node W. Because the route from node W through node Y is preferable to the route from node W directly to node X, node X transmits $RREP_B$ to node Y.

The link metric from node X to node Y has increased from 5 to 7. The metric from node X to node Y may have increased, for example, because of diminishing battery power of node X. The metric in $RREP_B$ is therefore 9+7, or 16. Node Y receives $RREP_B$ and transmits $RREP_C$ to node W. $RREP_C$ now includes the metric from node Z to node W, 21, and the cumulative metric experienced in the best route from node W to node Z, 23.

Figure 12B:
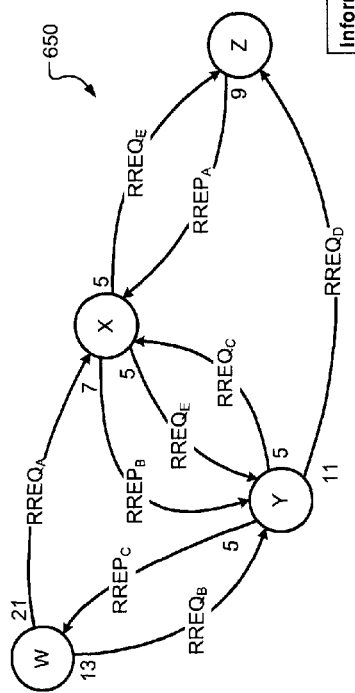
FIG. 12B is a tabular representation of forwarding table entries made during the route discovery process of FIG. 12A.

Referring now to FIG. 12B, a tabular representation of forwarding table (FWT) entries made during the route discovery process of FIG. 12A is presented. A table 654 includes FWT entries created during the route discovery process listed in approximate chronological order. The node whose FWT is being updated is listed in the second column, while the route discovery packet whose information is used to update the FWT is listed in column 1.

The entries in the FWT include a direct/reverse indicator, a destination address, a next hop address, a metric, and a source sequence number (SSN) and/or expiration time. When $RREQ_A$ is received by node X, node X creates a FWT entry indicating that node W (the destination address) is reachable via node W (the next hop address). The stored metric is 21. The FWT entry is listed as a reverse entry because the metric stored is from node W to node X and not from node X to node W.

$RREQ_A$ includes an SSN from node W, represented as lower case w. The SSN may be incremented for each route discovery process that node W initiates. For example, the next route discovery that node W initiates may have an SSN of w+1. The SSN may be used, as described in further detail below, to match RREPs with reverse FWT entries.

Row two indicates that node Y creates a FWT entry based upon information in $RREQ_B$. Similarly, node X creates a FWT entry based upon $RREQ_C$. The FWT entry that node X creates indicates that node W is reachable via node Y, with a reverse metric of 18. Node Z creates a FWT entry based on $RREQ_D$, indicating that node W is reachable via node Y and the route has a reverse metric of 24.

Node Y may then create a FWT entry based upon $RREQ_E$, indicating that node W is reachable from node Y via node X with a reverse metric of 23. Node Z also creates a FWT entry based upon $RREQ_E$ indicating that node W is reachable from node Y via node X with a reverse metric of 23. Node Z now has two FWT entries (shown in rows 4 and 6) with a destination of node W. The preferable FWT entry has a metric of 23, and an associated next hop of node X.

Node Z is the destination of the RREQs and therefore responds with an RREP. $RREP_A$ is transmitted to the selected next hop, node X. $RREP_A$ includes the best metric from node W to node Z. $RREP_A$ includes the SSN of the RREQ packets, w, which may now be stored in the destination sequence number (DSN) field of the RREP. In various implementations, node Z may store its own SSN, labeled z, in $RREP_A$. Node Z may increment its SSN upon initiating a route discovery.

$RREP_A$ may include the link metric experienced from node Z to node X, 9 in this example. Node X may then create two FWT entries. One entry, a reverse FWT entry, has a destination of node Z with a next hop of node Z and a reverse metric of 9. The SSN of the RREP, z, may be stored in the reverse FWT entry. Node Z may increment its SSN upon initiating a new route discovery.

Node X also creates a direct FWT entry to node Z via node Z. First, node X matches $RREP_A$ to a reverse FWT entry. Matching is necessary to accurately calculate a direct metric. The matching reverse FWT entry includes the metric from node W to node X, while $RREP_A$ includes the metric from node W to node Z. The direct metric from node X to node Z can therefore be calculated by subtracting the metric from W to X (18) from the metric from W to Z (23), yielding 5.

If the reverse FWT entry does not match $RREP_A$, such as if it has been replaced by a subsequent route discovery request, the calculation will be erroneous. In various implementations, the SSN of the reverse FWT entry is compared to the DSN of the RREP. In this example, the sequence numbers match, and the direct metric calculation is successful.

Node X creates $RREP_B$ and transmits it to node Y, the next hop in the selected reverse FWT entry. Node B creates two entries in its forwarding table based upon $RREP_B$, a reverse entry and a direct entry. In various implementations, direct FWT entries may include a decrementing expiration timer and/or an expiration time.

In the example of table 654, an expiration timer of 120 minutes is defined. The expiration timer may be decremented at periodic intervals. The expiration timeout may be decreased at predefined intervals. Alternately, expiration may be indicated by a stored time, with earlier times corresponding to older entries. Expiration times and/or timers may be tailored to fit the application in which the mesh network will be used. For example, in relatively static environments, timers may be on the order of days, while in more dynamic environments, timers may be on the order of seconds.

While reverse FWT entries are primarily used to match with RREPs, direct FWT entries contain actual metrics that will be experienced along a given route to a destination. Therefore, the most recent actual metric may be the most useful, as it is the one most likely to be accurate. When determining how to reach a given destination, a node may choose between an FWT entry with a better metric and a more recent FWT entry that is more likely to be accurate.

In various implementations, reverse FWT entries also include expiration timers and/or times. In various implementations, reverse and/or direct FWT entries include other indicators of timeliness, such as a creation time and/or a sequence number. While reverse FWT entries do not include accurate metrics, they do indicate via what route a destination node is reachable. Reverse FWT entries may also then be used when transmitting data packets.

Node Y transmits $RREP_C$ to node W. Node W creates two FWT entries, corresponding to direct and reverse routes to node Z via node Y. The cumulative channel metric from node W to node Z, 23, is stored in the direct FWT entry. In various implementations, the reverse FWT entry is discarded because the direct FWT entry already includes the actual metric to node Z.

$RREP_C$ may also contain an accumulated metric from node Z to node W. This is the metric experienced on the reverse of the best route from node W to node Z. The reverse of the best route from node W to node Z may not be the same as the best route from node Z to node W. However, the accumulated metric is an actual direct metric from node Z to node W.

In various implementations, node W can send a route acknowledgement (ACK) to node Z, informing node Z of this accumulated metric. The route ACK is sent along the best route as indicated by the FWT entries of node W, node Y, and node X. When node Z receives the route ACK, it can create a direct entry to node W. The direct entry is via node X and includes the metric of 21.

Referring now to FIG. 13A, an exemplary format of an RREQ packet is depicted. The RREQ includes a reserved 1-byte ID field and a 4-byte length field. The RREQ includes a 1-byte mode flag bit field. Bit 0 of the mode flag indicates whether the RREQ is unicast (zero) or broadcast (one). Bit 1 indicates whether the RREQ is a mesh portal announcement. In various implementations, no RREP is generated in response to a mesh portal announcement. Bits 2-7 are reserved. The RREQ includes a 1-byte time-to-live (TTL) field indicating the maximum number of hops that the RREQ should be allowed to traverse.

The RREQ includes a 1-byte destination count field indicating the number of destinations contained within the RREQ. In various implementations, the count field is fixed at one. The RREQ includes a 1-byte hop count field, which counts the number of hops that the RREQ has traversed. This hop count can be compared to the value in the TTL field to determine whether to continue forwarding the RREQ. The RREQ includes a 2-byte RREQ ID field, which together with the source address field uniquely identifies the RREQ.

The RREQ includes a 6-byte source address field indicating the original source address of the node requesting the route discovery. The RREQ includes a 2-byte source sequence number (SSN) field. Each node stores its own SSN and increments the SSN each time the node requests a new route discovery. The SSN can then be used to determine relative ages of route requests from the same source. The RREQ includes a 2-byte metric field, which contains the cumulative combination of the metrics from the source up to and including the link metric determined by the node transmitting this RREQ. The RREQ includes a 1-byte destination flag, of which bits 2-7 are reserved.

Bit 0 of the destination flag is the destination only bit, which indicates whether an intermediate node that already has an FWT entry for the destination address should respond to the RREQ. A value of zero indicates that the intermediate node should send a proxy route reply (RREP) based upon the entry in the intermediate node's forwarding table. A value of one indicates that only the final destination should reply to an RREQ.

Bit 1 of the destination flag is the always forward bit, which indicates whether an intermediate note should forward the RREQ regardless of whether the node has responded with an RREP. A value of zero indicates that if the intermediate node has responded with an RREP, the node should not then forward the RREQ. A one indicates that, regardless of whether the node responds with a proxy RREP, the RREQ should be forwarded on. The RREQ includes a 6-byte destination address that indicates the destination node to which the best route is being found. The RREQ includes a reserved 2-byte destination sequence number.

Referring now to FIG. 13B, an exemplary format of an RREP packet is presented. The RREP includes a reserved 1-byte ID field, a 4-byte length field, and a reserved 1-byte mode flag field. The RREP also includes a 1-byte TTL field, a 1-byte source count field, and a 1-byte hop count field. In various implementations, the source count field is fixed at one. The RREP includes a 2-byte received channel metric field, which contains the value of the metric that was selected by the RREQ destination (and therefore, the source of the RREP) as the metric of the best route.

The RREP includes a 2-byte RREP ID, which together with the destination address uniquely identifies the RREP. The RREP includes a 6-byte destination address indicating the final destination of the RREP, which was the source address in the RREQ. In various implementations, the RREP ID is set equal to the RREQ ID of the RREQ to which the RREP is responding.

The RREP includes a 2-byte destination sequence number (DSN) field. The DSN field may be set to the SSN field of the RREQ to which the RREP is responding. The DSN field can be used to match the RREP to stored reverse routes to accurately calculate intermediate metrics, as described in more detail above.

The RREP includes a 2-byte metric field, which is a cumulative combination of metrics from the source of the RREP up to and including the node transmitting the RREP. The RREP includes a 6-byte source address field indicating the original source of the RREP. A 2-byte source sequence number (SSN) may be reserved or may be the SSN of the RREP source as used in route requests.

Figure 14:
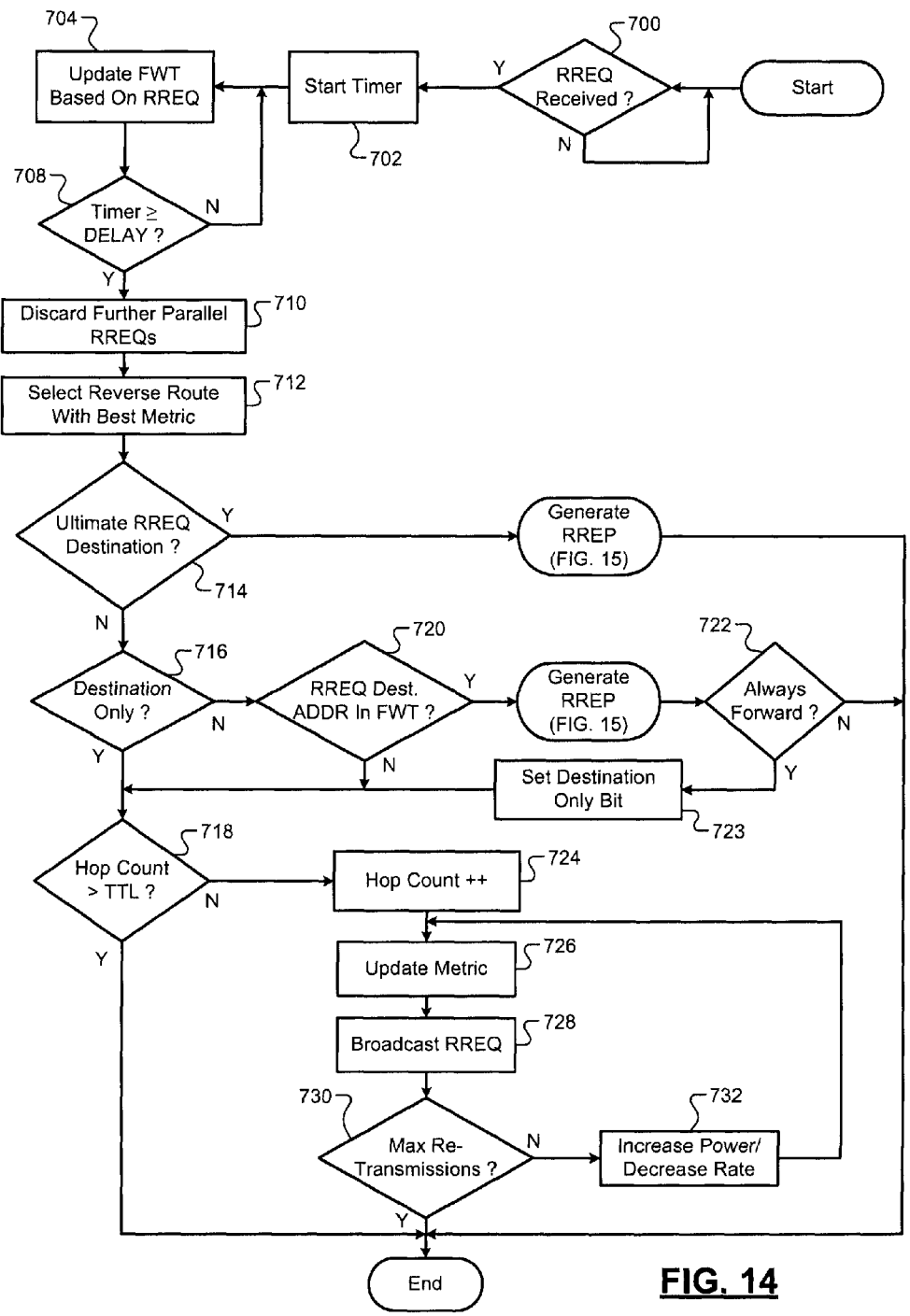
FIG. 14 is a flowchart depicting exemplary operation of a mesh node in receiving an RREQ packet.

Referring now to FIG. 14, a flowchart depicts exemplary operation of a mesh node in receiving an RREQ packet. Control begins in step 700. When an RREQ is received, control transfers to step 702; otherwise, control remains in step 700. In step 702, a timer is started. In various implementations, multiple timers are used to track multiple ongoing route discovery attempts. Control continues in step 704. In step 704, the forwarding table is updated based on the information contained in the RREQ packet, as described in further detail above.

Control continues in step 708. In step 708, the timer is compared to a configuration parameter DELAY. If the timer is greater than or equal to DELAY, control transfers to step 710. Otherwise, control returns to step 704, where the forwarding table is updated based upon any other received RREQs.

In step 710, the DELAY period has elapsed and any further RREQs from the same route discovery process will be discarded. RREQs may be compared based upon source sequence number (SSN) and source address (SA). If the SSNs and SAs are the same, the RREQs are part of the same route discovery process beginning at the same node. In various implementations, the RREQ ID is also used to compare RREQs.

Control continues in step 712, where the best reverse FWT entry for the source address of the received RREQ is selected. The best reverse FWT entry corresponds to the RREQ that includes the best metric. If the metric measures power required, the best metric would be the lowest metric. The best reverse FWT entry therefore corresponds to the path using the least energy from the route discoverer to the current node.

When the destination node is reached, the destination node also chooses the reverse FWT entry having the best metric. In this way, the best path from the route requestor to the destination node is found. In various implementations, all reverse entries are saved in case the path of the best reverse FWT entry fails, such as by a node leaving the mesh or transitioning to low power mode.

Figure 15:
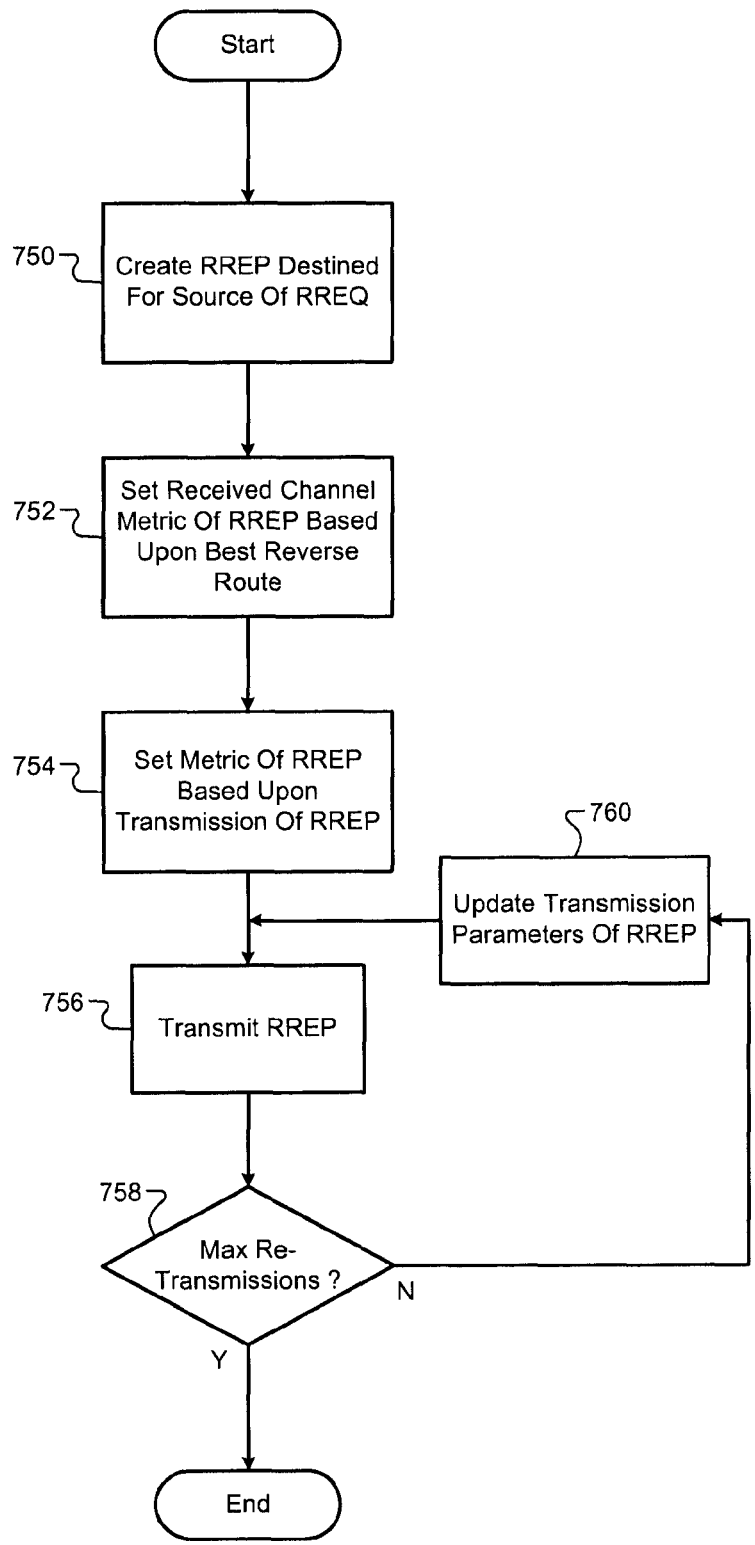
FIG. 15 is a flowchart depicting exemplary operation of a mesh node in generating an RREP packet.

Control continues in step 714. if the current node is the final destination of the RREQ, control generates an RREP as described in FIG. 15 and then ends. Otherwise, control transfers to step 716. In step 716, if the destination only bit of the RREQ destination flag is set, control transfers to step 718; otherwise, control transfers to step 720.

In step 720, control determines whether a direct FWT entry for the RREQ destination address exists. If so, control generates an RREP as described in FIG. 15 and then continues with step 722. In step 722, if the always forward bit of the destination flag is set, control transfers to step 723; otherwise, control ends. In step 723, control sets the destination only bit of the RREQ. Once a node has responded with a proxy RREP, any future node other than the destination should not send further proxy RREPs. Control then continues in step 718.

In step 718, control determines whether the RREQ should continue to be forwarded. To prevent such effects as broadcast storms, the time-to-live (TTL) of the RREQ can be analyzed. For example, if the hop count of the RREQ is greater than the TTL of the RREQ, control ends; otherwise, control transfers to step 724. In various implementations, the TTL may be decremented at each hop, and then compared to a value of zero.

In step 724, the value of hop count in the RREQ is incremented and control continues in step 726. In step 726, the metric contained in the RREQ is updated based upon factors such as battery life of the present node, power required for transmitting the RREQ, and/or number of retransmissions. Control continues in step 728, where control attempts to broadcast the RREQ to neighboring nodes.

In step 730, if the maximum number of retransmissions has been reached, control ends; otherwise, control transfers to step 732. In step 732, the transmission parameters of the RREQ are modified to increase the likelihood that the RREQ is received by neighboring nodes. For example, transmission power may be increased and/or data rate may be decreased.

In various implementations, neighboring nodes are associated with the transmitting nodes. Control may broadcast the RREQ at a power level expected to reach the neighboring nodes. Alternatively, a feedback mechanism may be used, whereby the power level is increased until neighboring nodes acknowledge receipt of the RREQ. In various implementations, these methods may be repeated in a unicast fashion for each neighboring node.

Referring now to FIG. 15, a flowchart depicts exemplary operation of a mesh node in generating an RREP packet. Control begins in step 750, where the mesh node creates an RREP having a destination address equal to the source address of the received RREQs. Control continues in step 752, where the metric of the selected route (best reverse FWT entry) is stored in the received channel metric field of the RREP. Control continues in step 754, where the metric field of the RREP is set based upon transmission of the RREP.

The metric may be based upon the battery state of the current node, the data rate available to send the RREP, and/or the power required to send the RREP (including retransmissions). Control continues in step 756, where the RREP is transmitted. In step 758, if the maximum number of retransmissions has been reached, control ends; otherwise, control transfers to step 760. In step 760, the transmission parameters for the RREP are modified to increase the likelihood that the RREP is received. The metric field of the RREP may also be updated, and control returns to step 756.

Figure 16:
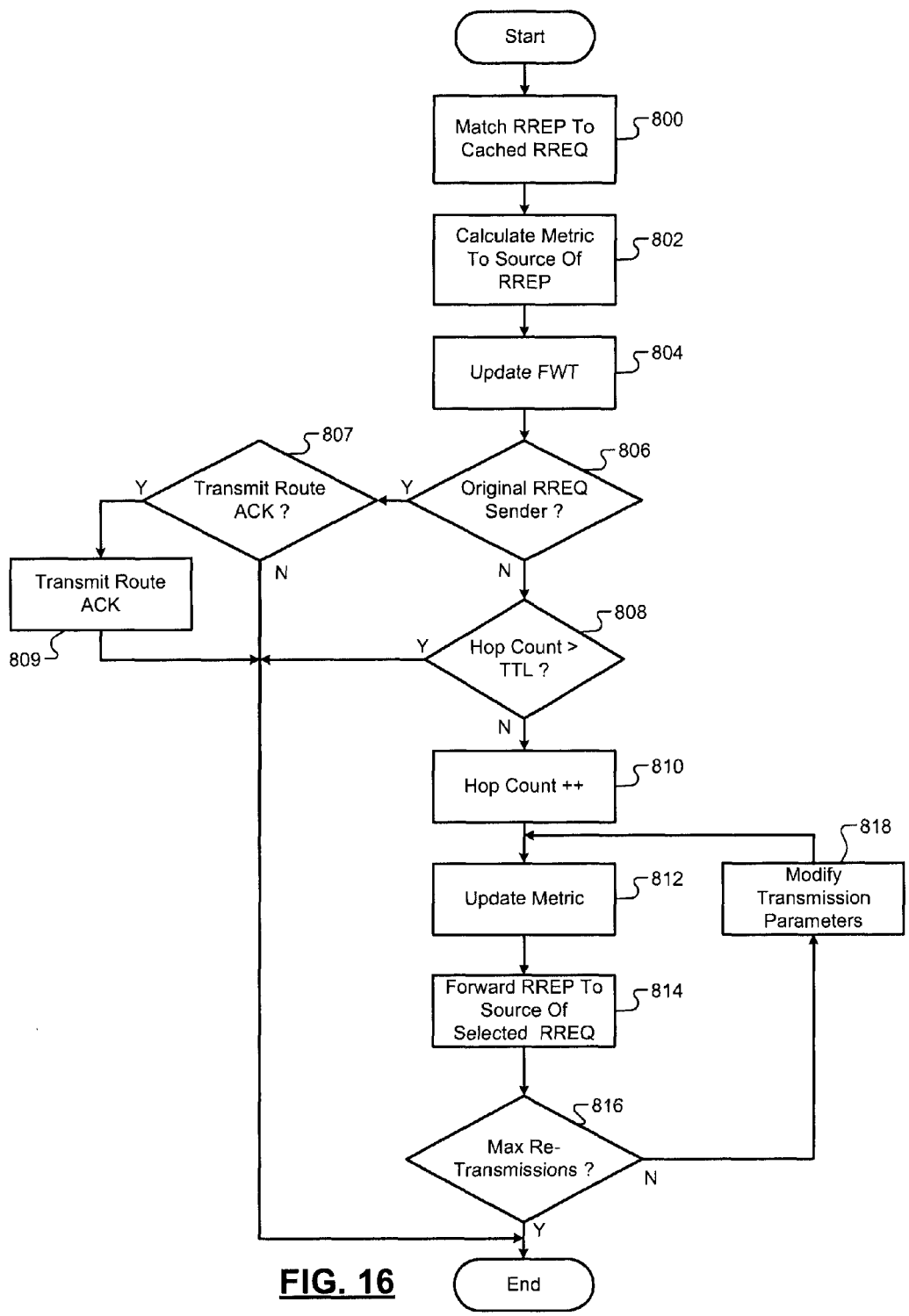
FIG. 16 is a flowchart depicting exemplary operation of a mesh node in receiving an RREP packet.

Referring now to FIG. 16, a flowchart depicts exemplary operation of a mesh node in receiving an RREP. Control begins in step 800, where the received RREP is matched to a reverse route based upon the RREP destination address, the RREP ID, and/or the RREP destination sequence number (DSN). If the best next hop of the selected reverse route is not available, another reverse route with the same destination address may be selected.

In step 802, control determines the intermediate metric from the current node to the RREQ destination. The metric from the RREQ source to the current node was received before and stored in the FWT. The total metric from the RREQ source to the RREQ destination has been received in the RREP. The current node can therefore remove the metric up to the current node from the total metric to obtain the metric between the current node and the RREQ destination.

Control then updates the forwarding table in step 804 with this information. Control may also create a reverse FWT entry based on the RREP. Control continues in step 806, by determining whether the current mesh node was the original source of the RREQ. If so, this route discovery has completed and control transfers to step 807; otherwise, control transfers to step 808. In step 807, control determines whether to send a route acknowledgement (ACK). If so, control transfers to step 809; otherwise, control ends. In step 809, control transmits a route ACK and then ends.

The route ACK includes the RREP metric as received at the RREP destination, which is the metric from the RREP source to the RREP destination. The route for this metric is the reverse of the best route from the RREQ source to the RREQ destination. If all links between nodes are symmetric, this reverse route will be the best route from the RREP source to the RREP destination. The Route ACK provides the RREP source with the metric to reach the RREP destination. The RREP source may use this path to reach the RREP destination, allowing it to forego its own route discovery process.

Referring now to step 808, control compares the hop count of the RREP to the TTL of the RREP. If the hop count exceeds the TTL, control ends; otherwise, control transfers to step 810. In step 810, the hop count is incremented. Control continues in step 812, where the metric of the RREP is updated. The metric may be updated based upon the parameters of the upcoming transmission of the RREP to the next node.

Control continues in step 814, where the RREP is forwarded to the next hop indicated by the selected reverse FWT entry. In step 816, if the maximum number of retransmissions has been reached, control ends; otherwise, control transfers to step 818. In step 818, transmission parameters for the RREP are updated to increase the likelihood of the RREP reaching neighboring nodes. The RREP metric may also be updated. Control then returns to step 812.

Figure 17:
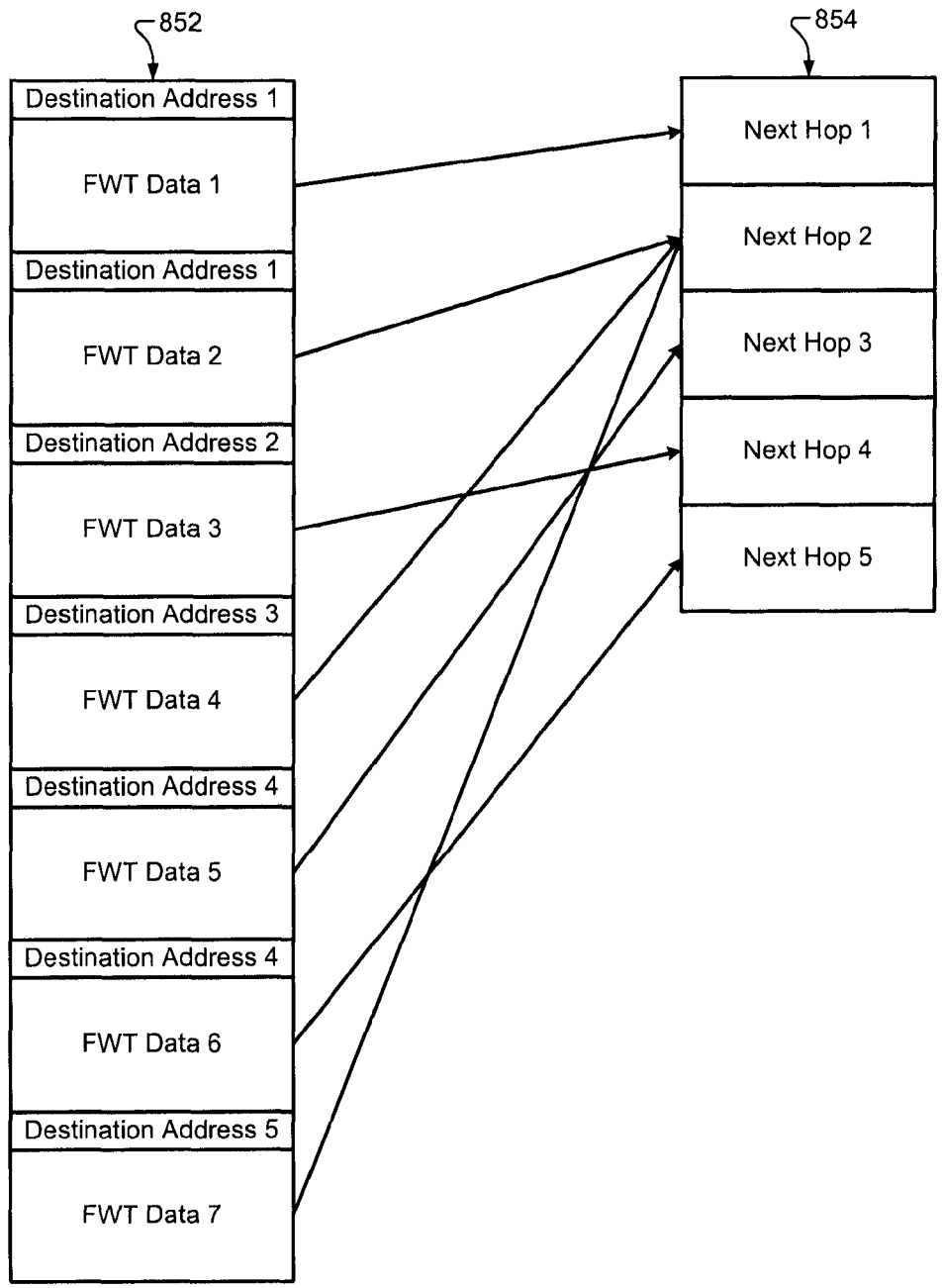
FIG. 17 is a functional block diagram depicting an exemplary implementation of a forwarding table.

Referring now to FIG. 17, an exemplary implementation of a forwarding table (FWT) is depicted. The FWT may be composed of two tables, a destination table 852 and a next hop table 854. Destination table 852 includes sets of FWT data indexed by destination address. Multiple sets of FWT data may be stored for the same destination address, such as shown for destination addresses 1 and 4 in FIG. 17.

Multiple entries allow for a different route to be selected if the preferred route is not available. Multiple entries may also allow for direct and reverse entries for a destination to be stored simultaneously. A field of each set of FWT data in the destination table 852 points to an entry in the next hop table 854.

In various implementations, the entries within the next hop table 854 are unique, with only one entry for each next hop. Multiple destination table entries may point to a single next hop entry, such as shown for FWT data 2, 4, and 7 in FIG. 17. The entries in the next hop table 854 are updated when the corresponding next hop changes state. For instance, the next hop may disassociate itself from the mesh network or may enter low-power mode.

When the corresponding entry in the next hop table 854 is updated, any corresponding routes in the destination table 852 are updated because they point to this updated information. The forwarding table may be updated in such instances as when beacons are received from a neighboring station, when a new data packet is received, when an RREQ or RREP is received, when a local link announcement is received, and when a peer disconnect message is received.

Referring now to FIG. 18, a more detailed depiction of forwarding table contents is shown. The destination table 852 includes entries having a 6-byte destination address field that stores the final destination address (such as MAC address) of the route. The destination table entries include a 4-byte pointer field that points to a next hop entry in the next hop table 854 that corresponds to the best next hop to reach the destination address.

The destination table entries include a 2-byte channel metric field indicating the expected metric to be experienced by a packet transmitted to the corresponding destination address. The destination table entries include a 1-byte hop count field indicating the number of hops expected in the specified route to the destination address. The destination table entries include a 1-byte direction field that indicates whether the entry is a direct route with an actual metric or a reverse route with an estimated metric. The estimated metric will be more accurate when links are more symmetric.

The destination table entries include a 2-byte sequence number field and an 8-byte lifetime field. The sequence number field may store source sequence numbers for reverse entries to allow matching with RREPs. The lifetime field indicates the length of time that the entry in the destination table 852 will remain valid. The entry may be removed from the destination table 852 after this period of time has elapsed. The value in the lifetime field may be reset to a value determined by a FWT_ENTRY_LIFETIME parameter when a corresponding RREQ or RREP is received. As discussed above, the lifetime field may alternately specify a specific time when the FWT entry expires.

The next hop table 854 includes entries having a 6-byte next hop address field that stores the physical (MAC) address of the next hop. The next hop table entries may include a 2-byte receiver signal-to-noise ratio (SNR) field, which stores the most recently measured SNR from the current node to the specified next hop. The next hop table entries also include a 1-byte sleep mode state field. In various implementations, the sleep mode state field can assume values from zero through four, indicating various levels of power saving modes.

For instance, a value of zero in the sleep mode field may indicate that no power saving is occurring at the next hop. A value of one may indicate that the next hop is in a power save mode but is awake during the announcement traffic indication message (ATIM) window. A value of two may indicate that the next hop is in a power save mode and will be awake for the duration of the next beacon transmission.

A value of three in the sleep mode field may indicate that the next hop is in a low power mode, where it will receive packets but not forward them. A value of four may indicate that the next hop is in deep sleep mode, not awakening for multiple beacon intervals. The next hop table entries may also include a field (that shown) that stores the number of beacon intervals before the next hop will awaken. This information may be obtained from 802.11mm firmware. If the next hop is a mesh portal, the sleep mode state field will likely have a value of zero because mesh portals remain awake to receive beacons from associated APs.

Referring now to FIG. 19, a table 880 graphically depicts exemplary configuration parameters for operation of a mesh node according to the principles of the present disclosure. The table 880 includes a BATTERY_COST_FCT parameter, which is a scaling factor for the battery condition when adjusting the channel metric. A greater value increases the sensitivity of the channel metric calculation to the battery condition.

The table 880 includes a DELAY parameter, which indicates the amount of time that a node should wait for further RREQ messages having the same sequence number and source address after receiving a first RREQ. The table 880 includes a MESH_PORT_ANN_DUR parameter, which specifies the interval between mesh portal announcement messages. Mesh portal announcements serve to appraise all the nodes in communication with the mesh portal of the preferred route to the mesh portal. Mesh portal announcement messages are indicated by a one in bit 1 of the mode flag of an RREQ packet.

The table 880 includes a BATTERY_COND_DUR parameter, which specifies how often to determine the battery condition of the node. The table 880 includes a MESH_METRIC_DLT parameter, which is a threshold that determines selection of the appropriate next hop. The table 880 includes a PAGING_DUR parameter, which indicates the time (specified in beacon intervals) between awakening events when in deep sleep mode.

The table 880 includes PAG_INTVL, which indicates the duration the node will remain awake while in deep sleep mode in order to receive an RREQ message. The table 880 includes a PAG_AWAKE_INTVL parameter, which indicates the duration that the node will stay awake while in deep sleep mode to receive data after reception of an RREQ message.

The table 880 includes an RREQ_NUM_RETRANSMISSION parameter, which indicates the number of times that a broadcast RREQ should be retransmitted. The table 880 includes a MAX_RETRANSMISSION parameter, which indicates the maximum number of times that a unicast packet should be retransmitted. The table 880 includes an FWT_ENTRY_LIFETIME parameter, which indicates the lifetime of an entry in the forwarding table.

Figure 20B:
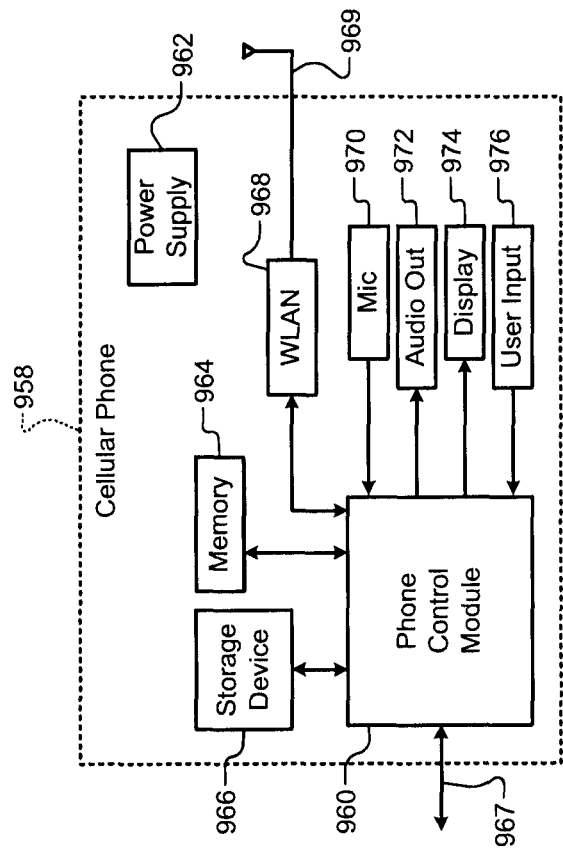
FIG. 20B is a functional block diagram of a cellular phone.
Figure 20A:
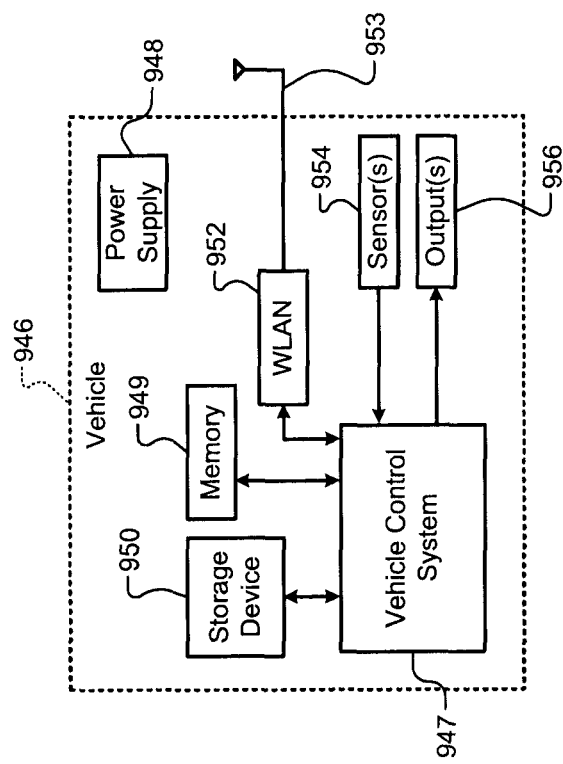
FIG. 20A is a functional block diagram of a vehicle control system.
Figure 20C:
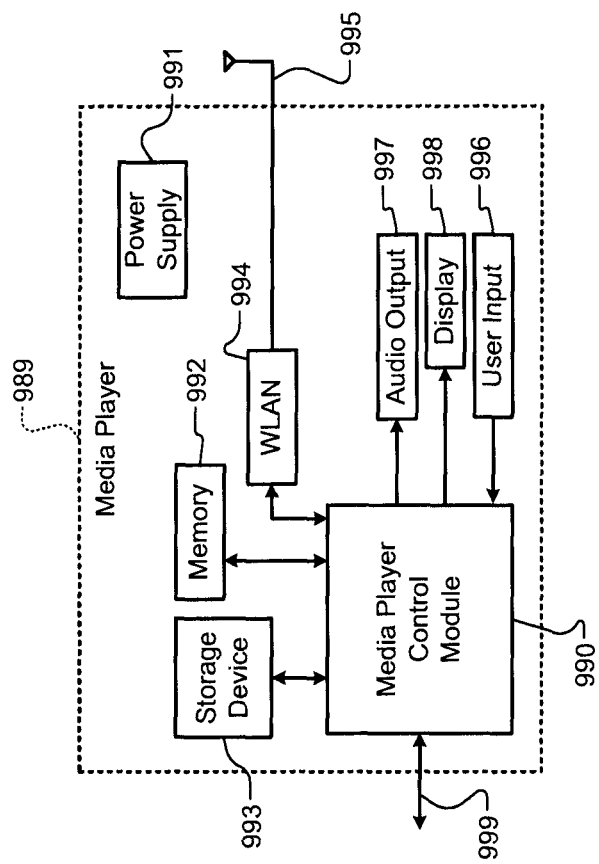
FIG. 20C is a functional block diagram of a media player.

Referring now to FIGS. 20A-20C, various exemplary implementations incorporating the teachings of the present disclosure are shown. Referring now to FIG. 20A, the teachings of the disclosure may be implemented in a WLAN interface 952 of a vehicle 946. The vehicle 946 may include a vehicle control system 947, a power supply 948, memory 949, a storage device 950, and the WLAN interface 952 and associated antenna 953. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, etc.

The power supply 948 provides power to the components of the vehicle 946. The vehicle control system 947 may store data in memory 949 and/or the storage device 950. Memory 949 may include random access memory (RAM) and/or nonvolatile memory such as flash memory, phase change memory, or multi-state memory, in which each memory cell has more than two states. The storage device 950 may include an optical storage drive, such as a DVD drive, and/or a hard disk drive (HDD). The vehicle control system 947 may communicate externally using the WLAN interface 952.

Referring now to FIG. 20B, the teachings of the disclosure can be implemented in a WLAN interface 968 of a cellular phone 958. The cellular phone 958 includes a phone control module 960, a power supply 962, memory 964, a storage device 966, a cellular network interface 967, and the WLAN interface 968 and associated antenna 969. The cellular phone 958 may include a microphone 970, an audio output 972 such as a speaker and/or output jack, a display 974, and a user input device 976 such as a keypad and/or pointing device.

The phone control module 960 may receive input signals from the cellular network interface 967, the WLAN interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the WLAN interface 968, and the audio output 972.

Memory 964 may include random access memory (RAM) and/or nonvolatile memory such as flash memory, phase change memory, or multi-state memory, in which each memory cell has more than two states. The storage device 966 may include an optical storage drive, such as a DVD drive, and/or a hard disk drive (HDD). The power supply 962 provides power to the components of the cellular phone 958.

Referring now to FIG. 20C, the teachings of the disclosure can be implemented in a WLAN interface 994 of a media player 989. The media player 989 may include a media player control module 990, a power supply 991, memory 992, a storage device 993, the WLAN interface 994 and associated antenna 995, and an external interface 999.

The media player control module 990 may receive input signals from the WLAN interface 994 and/or the external interface 999. The external interface 999 may include USB, infrared, and/or Ethernet. The input signals may include compressed audio and/or video, and may be compliant with the MP3 format. Additionally, the media player control module 990 may receive input from a user input 996 such as a keypad, touchpad, or individual buttons. The media player control module 990 may process input signals, including encoding, decoding, filtering, and/or formatting, and generate output signals.

The media player control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the media player 989. Memory 992 may include random access memory (RAM) and/or nonvolatile memory such as flash memory, phase change memory, or multi-state memory, in which each memory cell has more than two states. The storage device 993 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A wireless network device comprising:
a forwarding table configured to store direct entries and reverse entries, each of the direct entries and the reverse entries respectively including a destination address, a next hop address, and a metric, wherein the metric of the direct entries corresponds to a route from the wireless network device to the destination address, and wherein the metric of the reverse entries corresponds to a route from the destination address to the wireless network device; and
a mesh routing module configured to (i) wirelessly receive route discovery packets including a first route discovery packet and (ii) create, based on the route discovery packets, corresponding direct entries and reverse entries in the forwarding table,
wherein the mesh routing module is configured to, in response to receiving the first route discovery packet, create a corresponding direct entry in the forwarding table and create a corresponding reverse entry in the forwarding table.

2. The wireless network device of claim 1, wherein:
the route discovery packets include a second route discovery packet including a metric and a source address;
the mesh routing module is configured to, in response to receiving the second route discovery packet from a second wireless network device, create a second reverse entry in the forwarding table;
the next hop address of the second reverse entry is set to an address of the second wireless network device;
the destination address of the second reverse entry is set to the source address of the second route discovery packet; and
the metric of the second reverse entry is set to the metric of the second route discovery packet.

3. The wireless network device of claim 2, wherein:
the route discovery packets include a first route reply packet;
the first route reply packet includes a reply destination address; and
the mesh routing module is configured to, in response to receiving the first route reply packet, (i) identify ones of the reverse entries that have the reply destination address, and (ii) transmit the first route reply packet to the next hop address of a selected one of the identified reverse entries.

4. The wireless network device of claim 3, wherein the mesh routing module is configured to select the selected one of the identified reverse entries based on the metrics of the identified reverse entries.

5. The wireless network device of claim 3, wherein:
the reverse entries each include a sequence number; and
the mesh routing module is configured to set the sequence number of the reverse entry to a sequence number received in the second route discovery packet.

6. The wireless network device of claim 5, wherein the first route reply packet includes a reply sequence number, and wherein the mesh routing module is configured to (i) choose ones of the identified reverse entries that have the reply sequence number and (ii) select one of the chosen reverse entries based on the metrics of the chosen reverse entries.

7. The wireless network device of claim 1, wherein:
the route discovery packets include a first route request for a requested destination address; and
the mesh routing module is configured to, in response to receiving the first route request, (i) identify ones of the direct entries that have the requested destination address, and (ii) selectively respond to the first route request with the next hop address of a selected one of the identified direct entries.

8. The wireless network device of claim 7, wherein the mesh routing module is configured to select the selected one of the identified direct entries based on the metrics of the identified direct entries.

9. The wireless network device of claim 7, wherein the direct entries of the forwarding table each include an expiration indicator, and wherein the mesh routing module is configured to select the selected one of the identified direct entries based on the expiration indicators of the identified direct entries.

10. The wireless network device of claim 1, wherein the mesh routing module is configured to (i) transmit a second route discovery packet including a cumulative metric to a second wireless network device, (ii) determine the cumulative metric based on a received metric and a link metric, and (iii) determine the link metric based on a state of charge of the wireless network device and a transmission parameter of the second route discovery packet.

11. The wireless network device of claim 10, wherein the link metric increases as the state of charge decreases.

12. The wireless network device of claim 10, wherein the transmission parameter comprises energy used to transmit the second route discovery packet.

13. The wireless network device of claim 12, wherein the link metric is proportional to the energy used and inversely related to the state of charge.

14. The wireless network device of claim 12, wherein the mesh routing module is configured to transmit the second route discovery packet using increasing amounts of energy.

15. A method for operating a wireless network device, the method comprising:
wirelessly receiving route discovery packets, wherein the route discovery packets include a first route discovery packet; and
storing direct entries and reverse entries in a forwarding table based on the route discovery packets, each of the direct entries and the reverse entries including a destination address, a next hop address, and a metric, wherein the metric of the direct entries corresponds to a route from the wireless network device to the destination address, and wherein the metric of the reverse entries corresponds to a route from the destination address to the wireless network device,
wherein storing the direct entries and the reverse entries in the forwarding table includes, in response to receiving the first route discovery packet, storing a corresponding direct entry in the forwarding table and storing a corresponding reverse entry in the forwarding table.

16. The method of claim 15, further comprising:
receiving a second route discovery packet including a metric and a source address from a second wireless network device; and
creating a second reverse entry in the forwarding table, wherein the next hop address of the second reverse entry is set to an address of the second wireless network device, the destination address of the second reverse entry is set to the source address of the second route discovery packet, and the metric of the second reverse entry is set to the metric of the second route discovery packet.

17. The method of claim 16, further comprising:
wirelessly receiving a first route reply packet, the first route reply packet including a reply destination address;
identifying ones of the reverse entries that have the reply destination address; and
transmitting the first route reply packet to the next hop address of a selected one of the identified reverse entries.

18. The method of claim 17, wherein the selected one of the identified reverse entries is selected based on the metrics of the identified reverse entries.

19. The method of claim 17, wherein the reverse entries each include a sequence number, and wherein the method further comprises setting the sequence number of the second reverse entry to a sequence number received in the second route discovery packet.

20. The method of claim 19, wherein the first route reply packet includes a reply sequence number, and wherein the method further comprises:
choosing ones of the identified reverse entries that have the reply sequence number; and
selecting one of the chosen reverse entries based on the metrics of the chosen reverse entries.

21. The method of claim 15, further comprising:
receiving a route request for a requested destination address;
identifying ones of the direct entries that have the requested destination address; and
selectively responding to the route request with the next hop address of a selected one of the identified direct entries.

22. The method of claim 21, wherein the selected one of the identified direct entries is selected based on the metrics of the identified direct entries.

23. The method of claim 21, wherein the direct entries of the forwarding table each include an expiration indicator, and wherein the selected one of the identified direct entries is selected based on the expiration indicators of the identified direct entries.

24. The method of claim 15, further comprising:
receiving a second route discovery packet including a metric;
determining a link metric based on a state of charge of the wireless network device and a transmission parameter of a third route discovery packet;
determining a cumulative metric based on (i) the metric received from the second route discovery packet and the link metric; and
transmitting the third route discovery packet wirelessly to a first wireless network device, wherein the third route discovery packet includes the cumulative metric.

25. The method of claim 24 wherein the link metric increases as the state of charge decreases.

26. The method of claim 24, wherein the transmission parameter comprises energy used to transmit the third route discovery packet.

27. The method of claim 26, wherein the link metric is proportional to the energy used and inversely related to the state of charge.

28. The method of claim 26, further comprising transmitting the third route discovery packet using increasing amounts of energy.

\* \* \* \* \*